United States Patent
Wiggins et al.

(10) Patent No.: US 9,286,589 B2
(45) Date of Patent: Mar. 15, 2016

(54) METHOD AND SYSTEM FOR CUSTOMIZING A PROJECT

(71) Applicant: Caelo Media LLC, New York, NY (US)

(72) Inventors: Tripp Wiggins, Austin, TX (US); Jonathan Vlock, New York, NY (US)

(73) Assignee: Caelo Media, LLC, New York, NY (US)

( * ) Notice: Subject to any disclaimer, the term of this patent is extended or adjusted under 35 U.S.C. 154(b) by 394 days.

(21) Appl. No.: 13/651,260

(22) Filed: Oct. 12, 2012

(65) Prior Publication Data

US 2013/0185646 A1 Jul. 18, 2013

Related U.S. Application Data

(60) Provisional application No. 61/547,309, filed on Oct. 14, 2011.

(51) Int. Cl.
| | |
|---|---|
| *G06F 3/00* | (2006.01) |
| *G06Q 10/06* | (2012.01) |
| *H04L 29/08* | (2006.01) |

(52) U.S. Cl.
CPC ............ *G06Q 10/0633* (2013.01); *H04L 67/02* (2013.01); *H04L 67/306* (2013.01); *H04L 67/325* (2013.01)

(58) Field of Classification Search
None
See application file for complete search history.

(56) References Cited

U.S. PATENT DOCUMENTS

| | | |
|---|---|---|
| 1,717,048 A | 6/1929 | Livingston |
| 4,151,668 A | 5/1979 | Hungerford |
| 4,652,241 A | 3/1987 | McCarty |
| 4,858,350 A | 8/1989 | Malarchik |
| 4,872,112 A | 10/1989 | Hungerford |
| 4,914,590 A | 4/1990 | Loatman et al. |
| 5,101,349 A | 3/1992 | Tokuume et al. |
| 5,218,527 A | 6/1993 | Ishikawa et al. |
| 5,237,651 A | 8/1993 | Randall |
| 5,253,441 A | 10/1993 | Rachiele et al. |
| 5,339,546 A | 8/1994 | Rahwan |
| 5,499,188 A | 3/1996 | Kine, Jr. et al. |
| 5,530,863 A | 6/1996 | Hino |
| 5,583,763 A | 12/1996 | Atcheson et al. |
| 5,884,281 A | 3/1999 | Smith et al. |
| 6,035,280 A | 3/2000 | Christensen |
| 6,119,098 A | 9/2000 | Guyot et al. |
| 6,158,381 A | 12/2000 | Bray |

(Continued)

*Primary Examiner* — Stephen Alvesteffer
(74) *Attorney, Agent, or Firm* — Knobbe Martens Olson & Bear LLP

(57) ABSTRACT

A method, system, and computer readable media for managing a project over a computer network is disclosed. A project selection is received. Data associated with the project is retrieved in response to the selection. Data associated with a user profile is also retrieved, and compared to the data associated with the project to detect inconsistencies between the project and the user profile. In an embodiment, substitutions are determined based on the inconsistencies and automatically incorporated into the project. Data associated with the project including the substitutions is then delivered to the user over a computer network. In another embodiment, data associated with the project and the inconsistencies is delivered to the user over a computer network. In some embodiments, data associated with alternative project inputs and/or project actions consistent with the user profile is delivered to the user for substitution into the project. In some implementations, a selection of one or more alternative project inputs and/or project actions may be received from the user over a computer network.

8 Claims, 19 Drawing Sheets

(56) References Cited

U.S. PATENT DOCUMENTS

| | | |
|---|---|---|
| 6,195,657 B1 | 2/2001 | Rucker et al. |
| 6,236,974 B1 | 5/2001 | Kolawa et al. |
| 6,317,722 B1 | 11/2001 | Jacobi et al. |
| 6,370,513 B1 | 4/2002 | Kolawa et al. |
| 6,381,614 B1 | 4/2002 | Barnett et al. |
| 6,496,692 B1 | 12/2002 | Shanahan |
| 6,507,727 B1 | 1/2003 | Henrick |
| 6,585,516 B1 | 7/2003 | Alabaster |
| 6,789,067 B1 | 9/2004 | Liebenow |
| 6,975,910 B1 | 12/2005 | Brown et al. |
| 7,000,183 B1 | 2/2006 | Crawford |
| 7,050,056 B2 | 5/2006 | Meyringer |
| 7,090,253 B2 | 8/2006 | Phillips |
| 7,361,143 B2 | 4/2008 | Kirchhoff et al. |
| 7,624,259 B2 | 11/2009 | Bear et al. |
| 7,958,010 B2 | 6/2011 | Huang |
| 8,082,045 B1 | 12/2011 | Ashizawa et al. |
| 8,200,548 B2 | 6/2012 | Wiedl |
| 8,226,414 B2 | 7/2012 | Bodin et al. |
| 8,412,579 B2 | 4/2013 | Gonzalez |
| 8,504,440 B1 | 8/2013 | Kolawa et al. |
| 8,555,317 B2 | 10/2013 | Cho et al. |
| 2002/0026363 A1 | 2/2002 | Dunaway |
| 2002/0046060 A1 | 4/2002 | Hoskyns et al. |
| 2002/0171674 A1 | 11/2002 | Paris |
| 2003/0091964 A1 | 5/2003 | Yeager |
| 2003/0130908 A1 | 7/2003 | Hing |
| 2005/0050022 A1 | 3/2005 | Dukes et al. |
| 2005/0198353 A1* | 9/2005 | Zmrzli .................. 709/232 |
| 2005/0251449 A1 | 11/2005 | Pape et al. |
| 2006/0122468 A1 | 6/2006 | Tavor |
| 2006/0199155 A1 | 9/2006 | Mosher |
| 2007/0094065 A1 | 4/2007 | Wu et al. |
| 2007/0150371 A1 | 6/2007 | Gangji |
| 2008/0178749 A1 | 7/2008 | Stutman |
| 2008/0199835 A1 | 8/2008 | Yeager |
| 2008/0222553 A1 | 9/2008 | Benjamin-Lambert |
| 2009/0037288 A1 | 2/2009 | Christensen |
| 2009/0047638 A1 | 2/2009 | Jansen et al. |
| 2009/0132331 A1 | 5/2009 | Cartledge et al. |
| 2009/0181131 A1 | 7/2009 | Forbes-Roberts |
| 2009/0254446 A1 | 10/2009 | Chernyak |
| 2009/0259687 A1 | 10/2009 | Do et al. |
| 2009/0259688 A1* | 10/2009 | Do et al. .................. 707/104.1 |
| 2009/0275002 A1 | 11/2009 | Hoggle |
| 2009/0326687 A1 | 12/2009 | McCoy |
| 2010/0094692 A1 | 4/2010 | Meyerhofer et al. |
| 2010/0153209 A1 | 6/2010 | de Rubertis et al. |
| 2010/0179846 A1 | 7/2010 | Best et al. |
| 2010/0292998 A1 | 11/2010 | Bodlaender et al. |
| 2011/0055044 A1* | 3/2011 | Wiedl .................. 705/26.5 |
| 2011/0160902 A1 | 6/2011 | Postins |
| 2011/0213667 A1 | 9/2011 | Ierullo |
| 2011/0289044 A1 | 11/2011 | Harrison |
| 2012/0016781 A1 | 1/2012 | Hashimoto |
| 2012/0136751 A1 | 5/2012 | Ochtel |
| 2012/0317505 A1* | 12/2012 | Schwartz .......... G06Q 30/0633 715/764 |
| 2013/0138656 A1 | 5/2013 | Wheaton |
| 2013/0211948 A1 | 8/2013 | Lipscher et al. |
| 2013/0218692 A1 | 8/2013 | Fischer |
| 2013/0269297 A1 | 10/2013 | Minvielle |
| 2013/0295531 A1 | 11/2013 | Addanki et al. |

* cited by examiner

CookingPlanIt  Search Recipes | Plan Meals | My Kitchen | My Cookbooks | Shopping Assistant | Preferences banner ad

Meal Suggestions List

[Filter by cuisine ▽]  [Filter by diet ▽]  [Filter by other ▽]    List View | Gallery View  AA

Linguine with Artichokes and Lemon (substitute)
Scalloped Corn (substitute)
Herbed Sourdough Thins (substitute)

Time: 45 minutes
Skill: Easy
Rating: 4.5 from 24 reviews

Add to schedule
Add to my cookbook
Add to favorites
Add to shopping list

[ Let's Cook △ ]

Details ▽

Peppered Salmon (substitute)
Scrumptious Salad (substitute)
Apple Walnut Muffins with Flaxseed (substitute)

Time: 1 hr. 20 min.
Skill: Intermediate
Rating: 3.5 from 52 reviews

Add to schedule
Add to my cookbook
Add to favorites
Add to shopping list

[ Let's Cook △ ]

Nutritional Information:
Calories: 638
Fat: 20 gm
Carbohydrates: 50 gm
Sodium: 518 mg
Cholesterol: 40 mg

Tools needed:
Sautee pan
Large boiling pot
Spatula
Oven

Ingredients Needed: You have 10 of the 15 ingredients
• Salmon    • Tomatoes    • Apples
• Lemon     • Basil       • Flaxseed
• Butter    • Vinagerette • Walnuts
• Pepper    • Flour
• Romaine lettuce  • Sugar Close △

Healthy Meatloaf (substitute)
Carrot Soup (substitute)
Vanilla Rice Pudding (substitute)

Time: 45 minutes
Skill: Intermediate
Rating: 4.5 from 24 reviews

Add to schedule
Add to my cookbook
Add to favorites
Add to shopping list

[ Let's Cook △ ]

Details ▽

FIG. 11

METHOD AND SYSTEM FOR CUSTOMIZING A PROJECT

CROSS REFERENCE TO RELATED APPLICATIONS

This application claims priority under 35 U.S.C. Section 119(e) to U.S. Provisional Application 61/547,309, filed on Oct. 14, 2011. The entire disclosure of this provisional application including the appendices is hereby incorporated by reference.

BACKGROUND OF THE INVENTION

1. Field of the Invention

The present invention relates to project management over a computer network.

2. Description of the Related Art

Use of computers to assist with food preparation gained popularity in the late 1980's. Early generations of this product category may have run on the Microsoft Windows 3.1 operating system, making use of the popular IBM Compatible PC platform. These applications may have included a primitive database of recipes, and allowed users to enter and store their own set of recipes for later retrieval.

As the internet gained popularity, these applications migrated to a website form, but provided much of the same recipe based functionality. Web 2.0 added the ability for users to share their favorite recipes with other users over the internet, and to provide feedback on the recipes provided by a particular web site. Many web sites also added question and answer forums that enabled users to get specialized help with their individual recipe preparation challenges.

However, the ability of these applications to assist users with food preparation in a way that truly reduces the user's workload and enables professional meal preparation by individuals has always been limited. These limitations stem from the current generation of application's failure to recognize several aspects of the food preparation challenges faced by the average individual.

SUMMARY OF THE INVENTION

This patent application describes methods, systems, and computer readable media designed to solve many of the problems associated with the current generation of applications described above. By recognizing that food preparation frequently includes not only a single recipe, but an entire meal, the next generation of food preparation applications have the potential to significantly increase the assistance provided to modern food preparers, resulting in a more enjoyable food preparation experience, increased quality of the prepared food, and a lower total cost.

In addition to the methods, a computer-implemented system for performing a method according to various embodiments of the invention is also provided. The system, also referred to as an apparatus, includes a web server connected to a network, for example, the Internet. The web server further comprises a database and an application for providing an interface and performing the methods according to an embodiment of the invention. Methods according to the present invention may be performed by software residing on the web server, or on other servers on the network that are accessible to the web server. The web server may contain web pages and other information transmitted to the network in response to a request received from the network. The system may also include one or more secondary web servers connected to the network.

In addition, a computer readable media including instructions operative to configure a processor to perform the methods is also disclosed. This computer readable media may be included as part of a web server, or may be accessible by the web server. The computer readable media may be accessed by one or more web application programs running on one or more web servers that load and execute the instructions stored on the computer readable media. These instructions then cause the web server to perform aspects of the methods.

Another aspect disclosed is a computer implemented method of managing a project. The method includes receiving a project selection based at least in part on input received from a user over a computer network, retrieving data associated with an initial project execution plan corresponding to the selected project comprising project inputs and/or project actions from a digital electronic memory in response to the selection, retrieving data associated with a user profile from a digital electronic memory; comparing, in a digital electronic processor, the data associated with project inputs and/or project actions with the data associated with the user profile to detect inconsistencies between one or more project inputs and/or project actions and the user profile, and identifying, in a digital electronic processor, one or more alternative project inputs and/or project actions that reduce the detected inconsistencies, generating, with a digital electronic processor, a modified project execution plan incorporating the one or more alternative project inputs and/or project actions; and, delivering the modified project execution plan to the user over a computer network.

Another aspect disclosed is an apparatus for managing a project. The apparatus includes a processor and a memory operably connected to the processor. The memory stores instructions defining an execution plan generator, configured to receive a project selection based at least in part on input received from a user over a computer network, a consistency checker, configured to retrieve data associated with project inputs and/or project actions in response to the selection, and retrieve data associated with a user profile, and compare the data associated with project inputs and/or project actions with the data associated with the user profile to detect inconsistencies between one or more project inputs and/or project actions and the user profile.

Another aspect disclosed is an apparatus for managing a project. The apparatus includes means for receiving a project selection based at least in part on input received from a user over a computer network, means for retrieving data associated with project inputs and/or project actions in response to the selection, means for retrieving data associated with a user profile, means for comparing the data associated with project inputs and/or project actions with the data associated with the user profile to detect inconsistencies between one or more project inputs and/or project actions and the user profile, and means for identifying one or more alternative project inputs and/or project actions that reduce the detected inconsistencies, means for generating a modified project execution plan incorporating the one or more alternative project inputs and/or project actions; and, means for delivering the modified project execution plan to the user over a computer network.

A non-transitory, computer readable medium comprising instructions that when executed cause a processor to perform a method of managing a project. The method includes receiving a project selection based at least in part on input received from a user over a computer network, retrieving data associated with project inputs and/or project actions in response to the selection, retrieving data associated with a user profile; comparing the data associated with project inputs and/or project actions with the data associated with the user profile to detect inconsistencies between one or more project inputs and/or project actions and the user profile, identifying, in a digital electronic processor, one or more alternative project inputs and/or project actions that reduce the detected inconsistencies, generating, with a digital electronic processor, a modified project execution plan incorporating the one or more alternative project inputs and/or project actions, and, delivering the modified project execution plan to the user over a computer network.

Another innovative aspect is a method of preparing a meal. The method includes sending information over a computer network to a data store defining one or more of food preferences; dietary restrictions; cooking tools available; food ingredients available; and cooking skill level. The method further includes sending a recipe selection over a computer network, wherein the selected recipe contains one or more ingredients or actions that are inconsistent with at least one of the food preferences; dietary restrictions; cooking tools available; food ingredients available; and cooking skill level information previously sent, receiving, over a computer network, a recipe execution plan for the selected recipe containing substitutions for one or more ingredients or actions that reduce or eliminate the inconsistencies.

In some embodiments, the method may also include receiving information over a computer network associated with inconsistencies between the selected recipe and at least one of the food preferences; dietary restrictions; cooking tools available; food ingredients available; and cooking skill level information previously sent; and, selecting a substitution in response to the receiving.

A more complete understanding of the method, system, and computer readable media for meal organization and scheduling using a computer network will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 4A shows one embodiment of a user interface for editing a user profile.

FIG. 4C shows an embodiment of a user interface for editing a user profile.

FIG. 5B shows an embodiment of a user interface for displaying meal suggestions.

FIG. 11 shows one embodiment of a user interface for a meal overview page.

DETAILED DESCRIPTION

Figure 1:
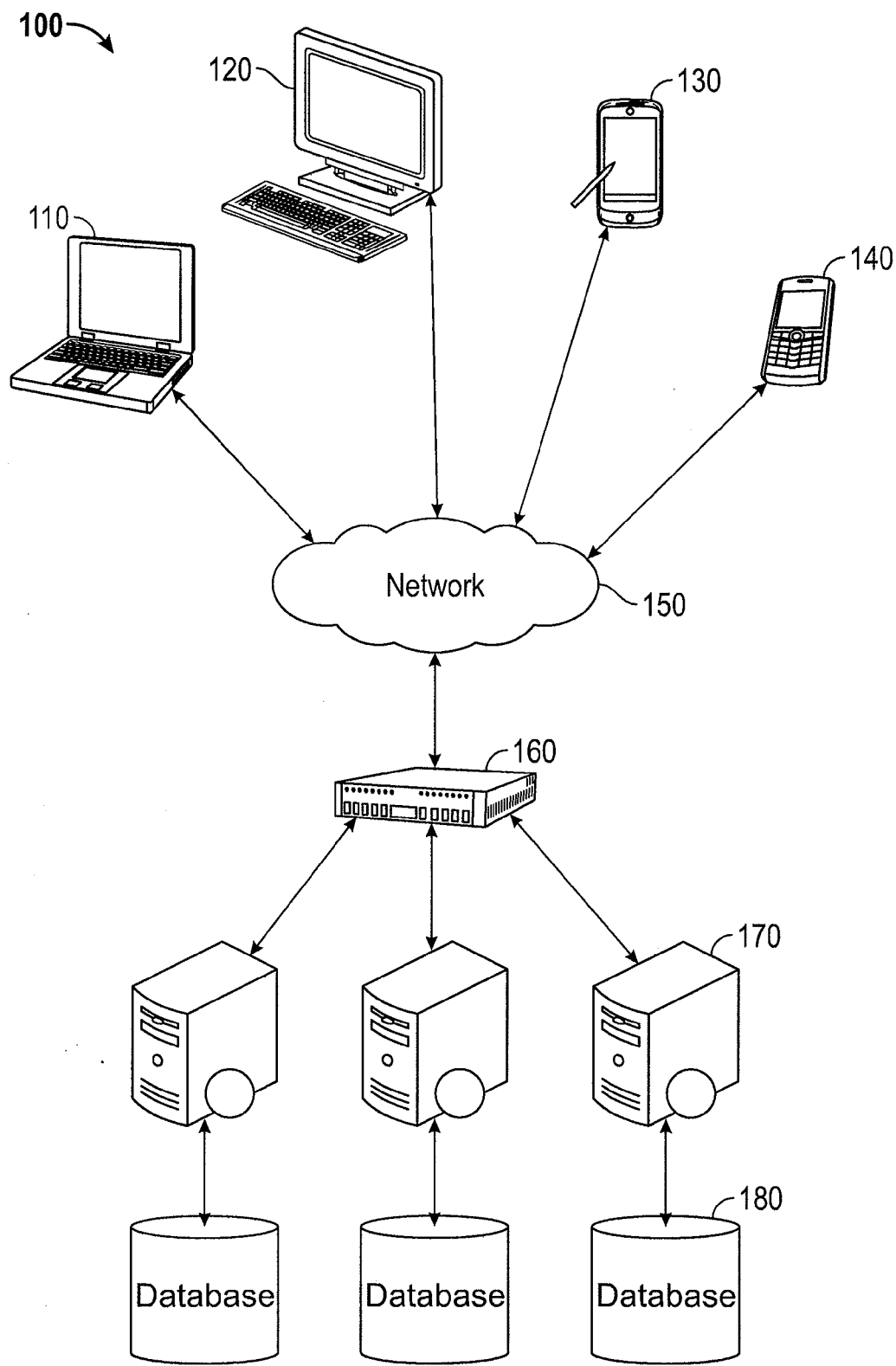
FIG. 1 is a block diagram illustrating a system for delivering a web application over a network according to the present invention.

The methods and systems disclosed herein satisfy the need for a method, apparatus, and computer readable media for managing a project. In some aspects, inconsistencies between project inputs and actions and characteristics of a user stored in a user profile may be detected. Alternative project inputs and actions may also be determined, and delivered to the user. A selection of one or more alternative inputs and actions may be received, and the project may be customized based on the one or more selected alternatives.

In one especially advantageous implementation, The methods and systems disclosed also satisfy the need for a method, system, and computer readable media for organizing and scheduling food preparation of a meal over a computer network, and overcome the limitations of prior art recipe based applications. In the detailed description that follows, like element numerals are used to describe like elements illustrated in one or more figures. Various terms and acronyms are used throughout the detailed description, including at least some of the following:

Application: Within the context of computer hardware and software, an application is a set of one or more computer programs that performs a function when executed within a computer hardware device. If the set is comprised of plural programs, the programs are coordinated to perform a function together; such programs may also perform other functions individually. Similarly, a program may be comprised of plural modules that perform certain functions individually and other functions when combined in various ways.

Client-Server: A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user. The program which responds to browser requests by serving Web pages is commonly referred to as a "Web server."

Cookies: A technology that enables a Web server to retrieve information from a user's computer that reveals prior browsing activities of the user. The information item is stored on the user's computer (typically on the hard drive) is commonly referred to as a "cookie." Many standard Web browsers support the use of cookies.

Distributable application: An application coded in a language, such as the JAVA language developed by Sun Microsystems, Inc. and currently owned by Oracle, Inc., such that the application may be distributed over a network, such as the Internet, and be successfully executed on a variety of computer hardware models running various operating systems.

Hyperlink: A navigational link from one document to another, or from one portion (or component) of a document to another. Typically, a hyperlink is displayed as a highlighted word or phrase that can be selected by clicking on it using a mouse or other pointing device to jump to the associated document or documented portion.

Hypertext System: A computer-based informational system in which documents other types of computer files are linked together via hyperlinks forming a user-navigable "web."

Information Exchange Group: A general term encompassing a particular set of protocols or rules for information sharing, together with a particular set of shared information or data collected or generated under the associated rules and protocols, and the users (or other sources) contributing information to, or accessing information in, the shared set of information. As implemented on the Web, information exchange groups include newsgroups, bulletin boards, message boards, chat rooms, and "Webrooms." Webrooms are further described in the detailed description below, and in the co-pending application referenced therein.

Internet: A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ('Web"): Used herein to refer generally to both (i) a distributed collection of interlinked, user-viewable Web pages and other linked data and distributable applications that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Page: A hypertext file or document that is encoded using a language such as HTML, for viewing on a client computer using a browser application. A Web page may include visible components, such as text, images, hyperlinks, and a background, and/or invisible components, such as meta tags and formatting instructions. In comparison to the term "Web page," the more general term "page" encompasses many other types of computer files that are not necessarily encoded for viewing using a browser, e.g., text files, bit-maps, audio files, and so forth.

Web Site: A computer system that serves informational content over a network using the standard protocols of the World Wide Web. Typically, a Web site corresponds to a particular Internet domain name, such as "electronsearch.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language): A standard coding convention and set of codes for attaching presentation and linking attributes to informational content within documents. (HTML 2.0 is currently the primary standard used for generating Web documents, although it should be appreciated that other coding conventions could be used within the scope of the present invention.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

HTTP (HyperText Transport Protocol): The standard World Wide Web client-server protocol used for the exchange of information (such as HTML documents, and client requests for such documents) between a browser and a Web server. HTTP includes a number of different types of messages that can be sent from the client to the server to request different types of server actions. For example, a 'GET' message, which has the format GET <URL>, causes the server to return the document or file located at the specified URL.

URL (Uniform Resource Locator): A unique address which fully specifies the location of a file or other resource on the Internet. The general format of a URL is protocol://machine address:port/path/filename. The port specification is optional, and if no port is specified, the browser defaults to the standard port for whatever service is specified as the protocol.

The foregoing definitions are not intended to limit the scope of the present invention, but rather are intended to clarify terms that are well understood by persons having ordinary skill in the art. It should be appreciated that the defined terms may also have other meanings to such persons having ordinary skill in the art. These and other terms are used in the detailed description below.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. The functionality of different blocks can be moved, combined, or re-arranged, as the different blocks are present for illustrative purposes only. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Previous generations of applications have failed to assist users with organizing and planning an entire meal because of their general focus on individual recipes. Organizing an entire meal introduces several complexities that are missed by focusing only on individual recipes.

For example, when focusing on individual recipes, traditional applications fail to aggregate all of the ingredients necessary for an entire meal into one integrated list or display.

These applications also fail to assist users with the scheduling challenges associated with preparing several items at the same time. For example, two items planned for the same meal may both require use of a single oven at the same time, with incompatible temperature profiles. Traditional applications also fail to recognize that meal preparation may not be performed solely by a single individual, but instead is frequently a communal event. For example, several members of the same household may assist in preparing the meal. Guests at a meal may also prepare items at an alternate location and then transport their prepared items to the meal venue at an appropriate time.

Previous generations of applications further fail to assist meal preparers with the selection of items for a meal based on the requirements and preferences of those attending the meal. For example, a meal including chicken broth may be inappropriate to serve to a vegetarian guest. Even more troublesome, a meal including peanut derivatives may be catastrophic to serve to a guest with strong peanut allergies.

Furthermore, previous generations of applications also fail to assist users with the complexities of ensuring adequate kitchen supplies are available to successfully prepare an entire meal. For example, two items planned for a meal may both require a dutch oven, when the food preparation venue has only one dutch oven available.

Referring to FIG. 1, a block diagram is illustrated of a network employing a method and system according to the invention. It is anticipated that the present web application system 100 operates with a plurality of computers which are coupled together on a network, such as the Internet 150, or other communications network. FIG. 1 depicts a network that includes user computers 110, 120, 130, and 140 that communicate with one or more web servers 170 though communication links that include the Internet 150. The user computers 110, 120, 130, and 140 may be any type of computing device that allows a user to interactively browse websites, such as a personal computer (PC) that includes a web browser (e.g., Microsoft Internet Explorer™ or Google Chrome™). Suitable user computers equipped with browsers are available in many configurations, including handheld devices 140 (e.g., Apple iPhone™, Google Android, or RIM Blackberry), personal computers (PC), laptop computers 110, workstations 120, television set-top devices, tablets (130) and so forth.

The one or more web servers 170 may be optionally managed by a load balancer 160. Load balancer 160 may receive requests from computer network 150 and route these requests to one or more web servers 170 based on a variety of criteria. These criteria may optionally include the current load of each web server 170, session information included in the network request, a round robin counter maintained by load balancer 160, or other criteria.

One or more web servers may also communicate with one or more databases 180. These databases may be in a mirrored or striped configuration to support the data storage requirements of web applications running on web server(s) 170.

The web server(s) 170 includes a server computer running a web interface application and capable of selectively delivering data files, such as HTML files, to the user computers using a protocol such as HTTP. Web server 170 may also dynamically generate content for delivery to user computers in response to a request from a user computer. The content may be generated by web server 170 directly, or may be generated by other computers linked to web server 170 in response to a request from web server 170. Web server 170 may then forward the requested content to a user computer over network 150.

In addition to exposing a user interface capable of being viewed on a browser as described above, web server 170 may also expose a web services interface on network 150. The web services interface may use the SOAP protocol to provide the web services or any other protocol known in the art. Such interfaces may provide an ability for other network based programs to interface with the meal organization and scheduling methods provided by web server 170 in one aspect of the present invention.

Web server applications may be coded in various programming languages, such as Java, Perl, C#, C, or C++, and are customized to run on their respective servers 170. Web servers 170 may also include applications utilizing a variety of specialized application languages such as Microsoft Silverlight™, or Adobe Flash™ to implement user interfaces displayed on the user computers. These specialized applications may be integrated with files or dynamic content provided by Web server 170 to the user computers in response to a request from those user computers.

Web server applications, such as those running on web server 170, also typically interface with a database application, such as a SQL Server™ engine from Microsoft Corporation, Oracle™ database engine, or MySQL as part of their architecture. These database applications may control or manage database servers 180 illustrated in FIG. 1.

Web applications running on web server 170 may access a database of web pages, distributable applications, and other electronic files containing information of various types. Web pages or other electronic files may be viewed on the displays of the user computers by a suitable application program residing on a user computer, such as a browser, or by a distributable application provided to a user computer by the web server 170. It should be appreciated that many different user computers, many different web servers, and many different application servers of various types may be communicating with each other at the same time.

The present invention allows a user to organize and schedule meal preparation. Users perform the methods of the present invention by interacting with browsers on their user computers via web pages. Web pages are generally requested by communicating an HTTP request from a browser application. The HTTP request includes the Uniform Resource Locator (URL) of the desired web page, which may correspond to a web page stored at a destination web site, such as web server 170. The HTTP request is routed to the web server 170 via the Internet 150. The web server 170 then retrieves the requested web page, identified by a URL, from database 180 and communicates the web page across the Internet 150 to the browser application running on user computers 110, 120, 130, or 140. The web page may be communicated in the form of plural message packets as defined by standard protocols, such as the Transport Control Protocol/Internet Protocol (TCP/IP), although it should be appreciated that communication using other protocols would be within the scope of the invention.

Figure 2:
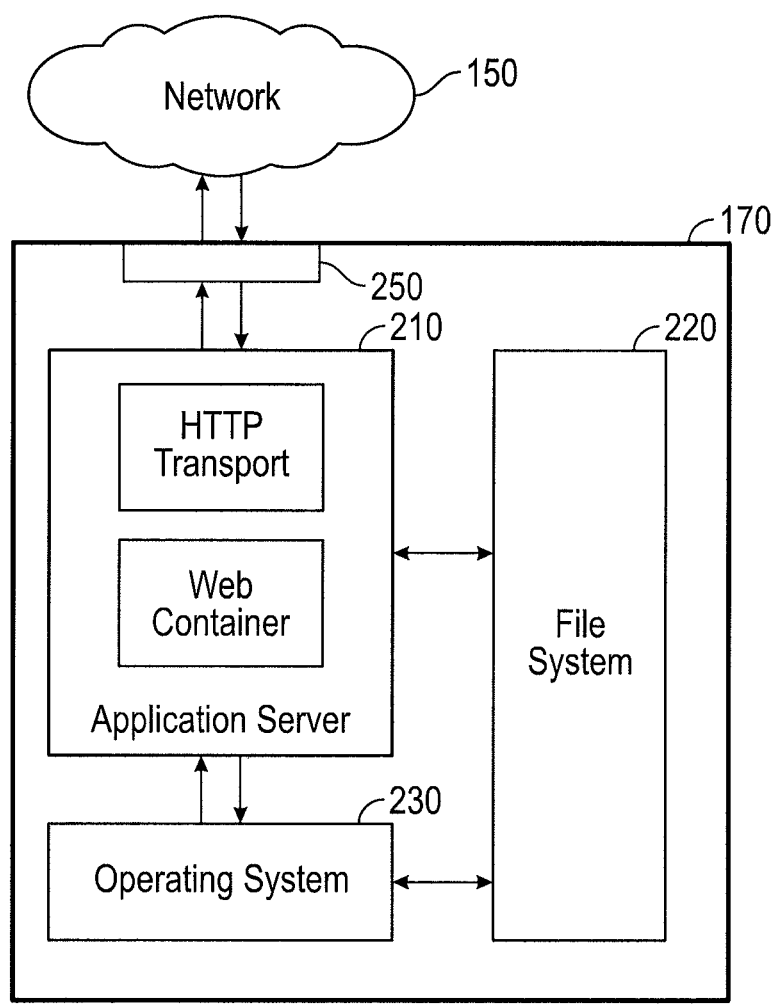
FIG. 2 is a simplified block diagram illustrating the internal software architecture of one embodiment of a web server 170.

FIG. 2 is a simplified block diagram illustrating the internal software architecture of one embodiment of web server 170. Web server 170 may be implemented using one of several standard hardware web server platforms including general purpose computers or specialized web server computers from any one of a number of manufacturers to include Hewlett Packard, Apple, Dell, IBM, or the like. These web server hardware platforms may run any one of a number of operating systems 230 to include Microsoft Windows Server, Linux, or several other versions of Unix. Web Server 170 may also be virtualized within a server virtualization system such as VMWare to enable multiple web servers or other applications to operate on one individual computer.

Running on these hardware and operating system web server platforms may be software applications including what is known in the art as an application server 210. Applications servers may include Apache Tomcat, Websphere, or Jboss. Simplified web application architectures may also be used, to include http servers such as an Apache http server running cgi scripts, or open source applications such as Drupal or Jumla.

As illustrated in FIG. 2, Application Server 210 running on web server 170 interacts via a network port 250 with a network 150. Application server 210 may receive requests from the network 150 generated by user computers of FIG. 1 over network port 250. Within Application server 210 may be a web container containing one or more web application programs as described above. These applications may respond to the network requests generated by user computers to deliver web content back to user computers over network 150. These application programs may include instructions that configure a processor running in web server 170 to perform the methods of one or more operative embodiments described herein.

Web server 170 also includes a file system 220. Application server 220 may read and write data to file system 220 in order to respond to requests from user computers over network 150. File system 220 may store static files including html files that define one or more aspects of a user interface provided by Application Server 210 to user computers over network 150. File system 220 may also store instructions of the web applications described above that cause the processor running in web server 170 to perform the method of one or more of the operative embodiments described in this application.

Figure 3:
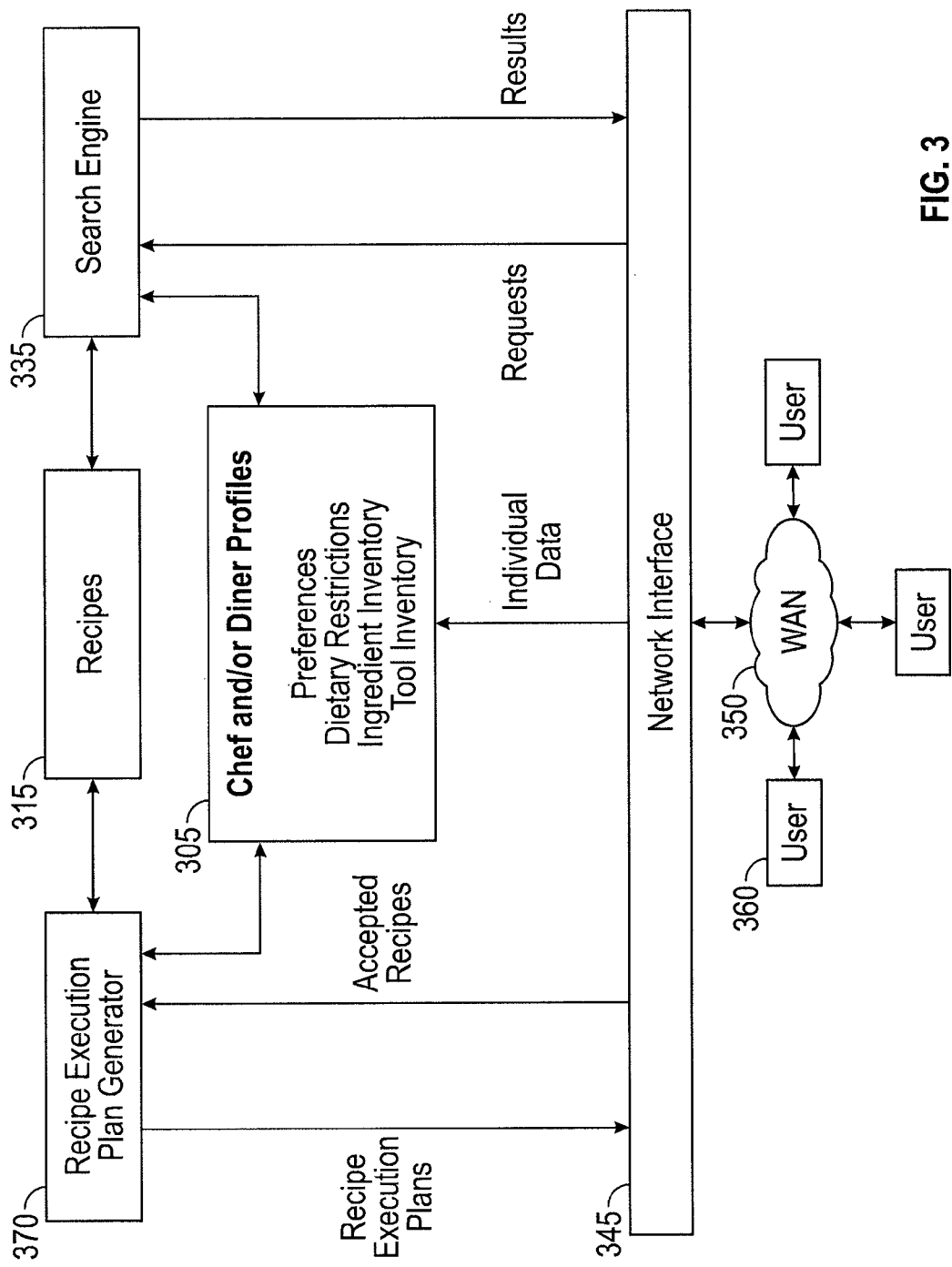
FIG. 3 is a block diagram of an apparatus for managing and scheduling meal preparation.

FIG. 3 is a block diagram of an apparatus for managing and scheduling meal preparation. The apparatus includes a recipe execution plan generator 370, recipe data store 315, a search engine 335, chef and/or diner profiles 305, and a network interface 345. The apparatus is in communication with three users 360 over a wide area network (WAN) 350. The apparatus of FIG. 3 may be part of software and hardware on a web-server 170 such as described above with reference to FIGS. 1 and 2.

Figure 4A:
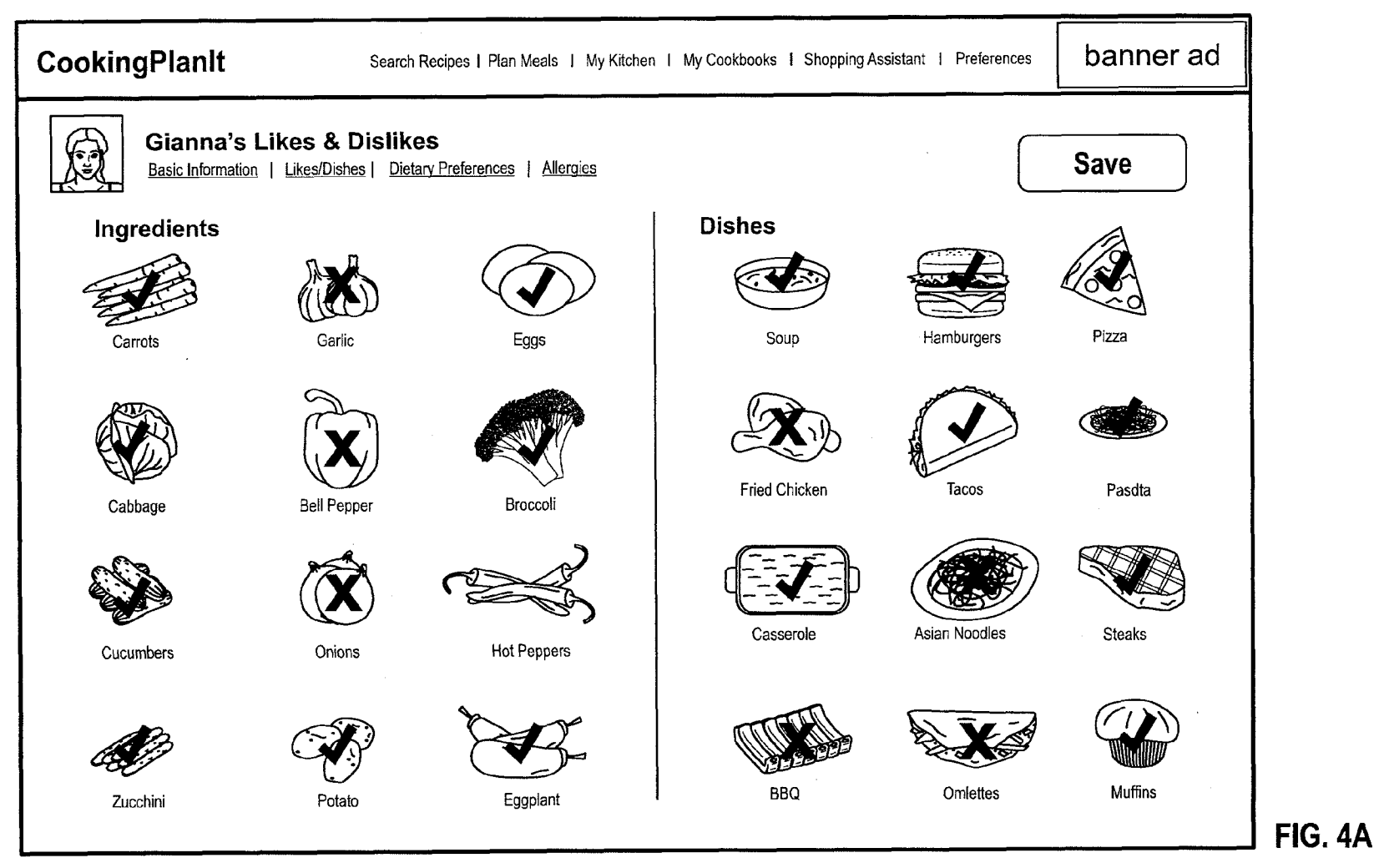
Figure 4B:
FIG. 4B shows one embodiment of a user interface for editing a user profile.
Figure 4C:
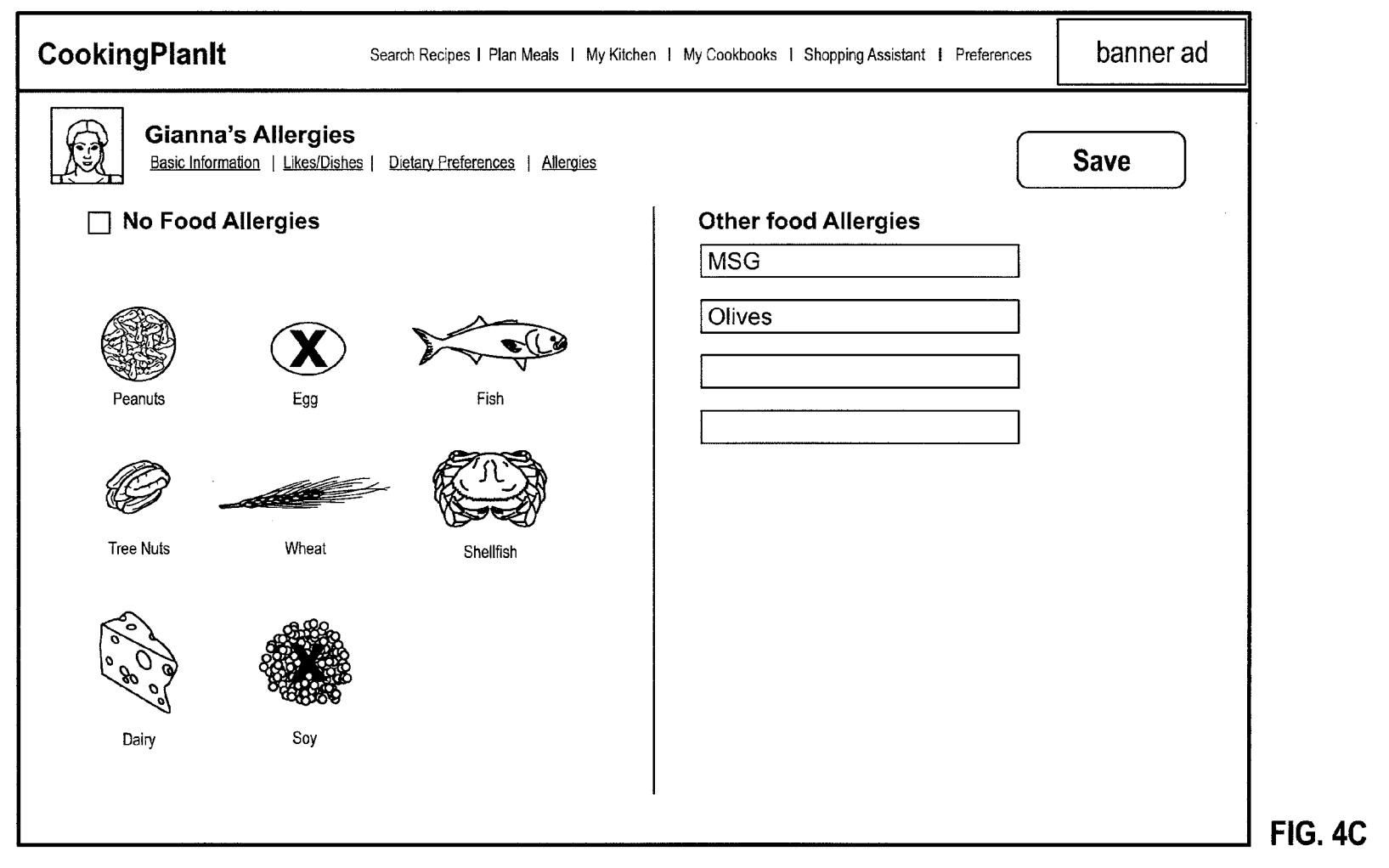

Chef and/or diner profiles 305 (also referred to as "user profile(s) herein") may include data indicating one or more preferences, dietary restrictions, and/or allergies of a user, where the term "user" includes any one or more of the people associated with a meal such as the people that will prepare the meal and the people that will eat the meal. Chef and/or diner profiles 305 may also include data indicating food ingredients or cooking tool inventories of a user. Examples of possible content of such profiles are illustrated in FIGS. 4A-4C.

Users 360 interface with search engine 335 to search for recipes and review search results. The search engine 335 searches the recipes data store 315 for recipes that meet criteria specified by users 360 in the search requests, and may return the results to the user over the WAN 350. For some searches, search engine 335 may also base the search results returned to the user on information in one or more chef and/or diner profiles 305. For example, in an embodiment, a user with a dietary restriction that prevents the consumption of dairy products may perform a search for Italian recipes. Some of the Italian recipes stored in recipe datastore 315 may include pasta dishes with a white sauce. The white sauce may include dairy products. Search engine 335 may remove these recipes from the search results delivered to user 360 by consulting the user's 360 dietary restrictions in the chef and/or diner profiles 305.

As described further below with reference to FIGS. 5A to 5C, some implementations include an advantageous "meal centric" rather than "recipe centric" user interaction with the system. For example, the user may perform a search using certain criteria such as cuisine type, and the search results may return not just individual recipes, but complete meals comprising multiple individual dishes that satisfy the search criteria. As used herein, the term "meal" means a set of dishes having separate recipes that are consumed at approximately the same time. FIG. 5C described below illustrates one example user interface for displaying and interacting with search results in accordance with these principles.

After search results are delivered to the user 360, the user may accept one or more of the recipes included in the search results. The acceptance of one or more recipes may be communicated to the recipe execution plan generator 370. After the recipe execution plans are generated, they may be communicated back to user 360 over WAN 350. The recipe execution plan generator 370 is discussed in more detail below.

FIG. 4A shows one embodiment of a user interface for viewing and editing a user profile. The user interface is divided into two main regions, with ingredients in the left region and dishes in the right region. Ingredients and dishes that are liked by the user Gianna are marked with a check mark. Ingredients and dishes that are disliked by Gianna are marked with an "X." In an embodiment, icons in either the ingredients or dishes regions of the user interface may be selected with a pointing device to toggle between like, dislike, or no indication. When a user is satisfied with how their likes and dislikes are recorded, they may select the "save" button on the top right to save the information to a persistent copy of their user profile.

FIG. 4B shows one embodiment of a user interface for editing additional information in a user profile. This user interface is also divided into two regions. The left region allows a user to specify dietary preferences. For example, Gianna has specified that she prefers Gluten-Free, Low-Sodium, Heart Healthy, Low Cholesterol, and low fat foods. Gianna does not necessarily prefer sugar free or dairy free foods, for example. The right region of user interface 430 allows the user to specify dietary preferences that may be expressed using multiple values or levels. For example, a user may specify whether they prefer the spiciness of their food to be mild, medium, or hot. When the user is satisfied with their selections, they may save the settings using the save button in the upper right portion of the user interface.

FIG. 4C shows an embodiment of a user interface for editing additional information in a user profile. The user interface of FIG. 4C allows a user to specify food allergies. By selecting one or more of the icons, allergies to particular food items may be specified. In an embodiment, selecting an already selected food item may deselect the food item. Once the user is satisfied with the selections displayed on the user interface, they may save the information to a persistent copy of their user profile using the save button in the upper right portion of the user interface.

Figure 5A:
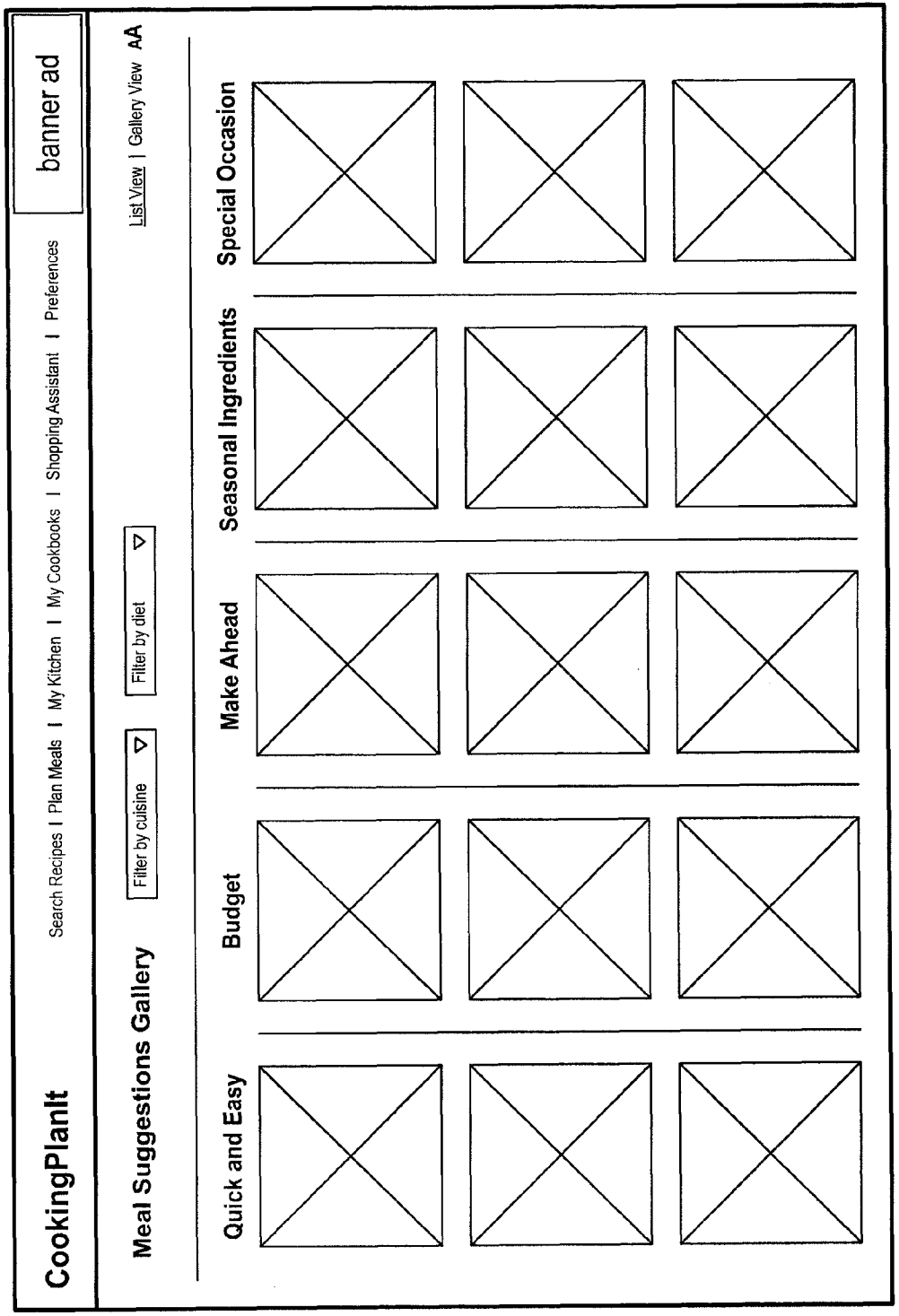
FIG. 5A shows an embodiment of a user interface for displaying meal suggestions.
Figure 5C:
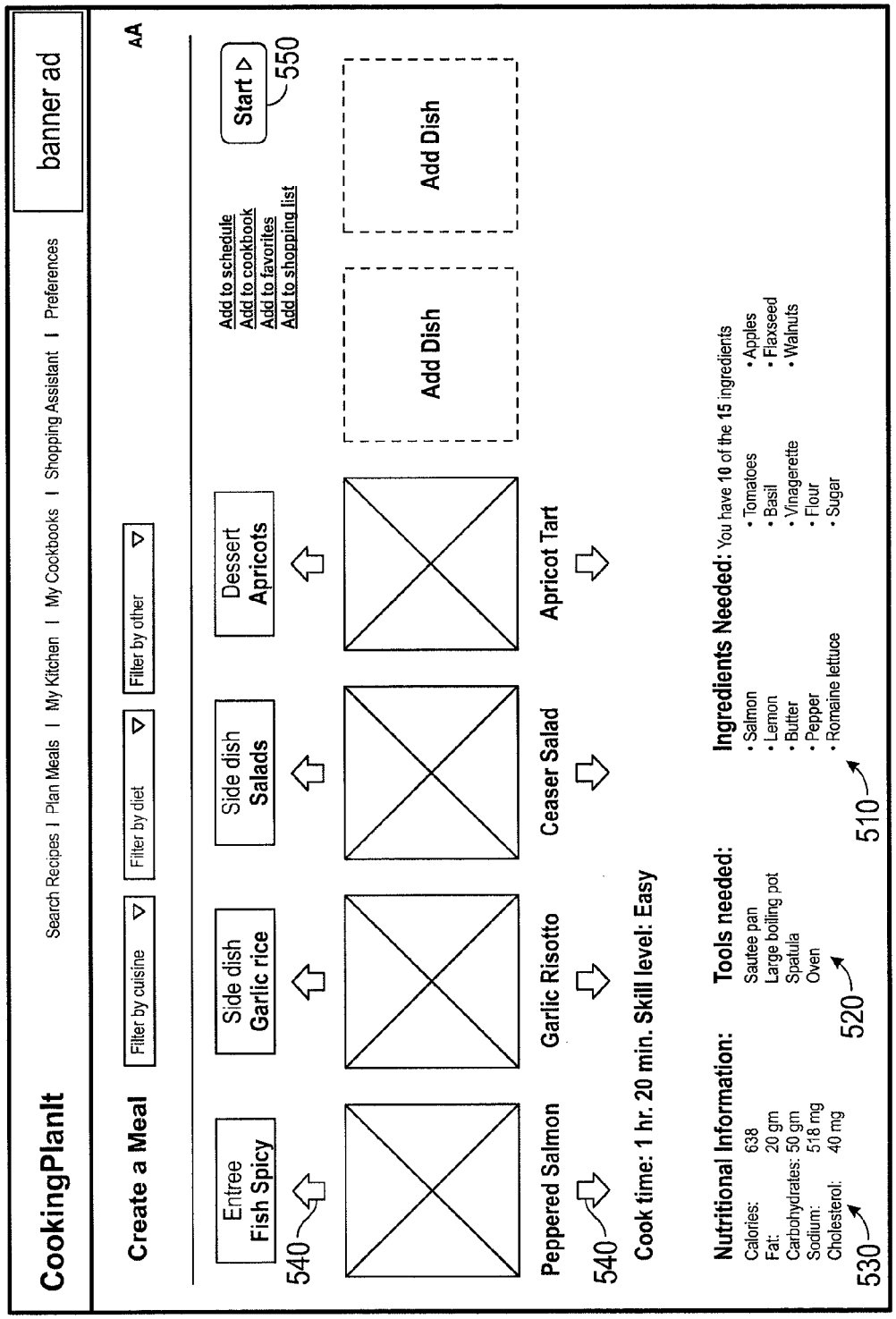
FIG. 5C shows an embodiment of a user interface for creating a meal.

FIG. 5A shows an embodiment of a user interface for displaying meal suggestions retrieved during a search. The illustrated embodiment allows a user to browse five selected categories of meals. The categories can also be filtered using the filter drop down boxes as shown. In the illustrated embodiment, each of the five categories may be browsed vertically. Boxes with "X"s in them may be graphic or photographic illustrations, but these are not shown in these figures.

FIG. 5B shows another embodiment of a user interface for displaying meal suggestions. In the illustrated embodiment, suggested meals are shown vertically. Information about each suggested meal is also displayed, such as the time required to prepare the meal, the skill level necessary to prepare the meal, and a rating based on feedback of the recipe from other users.

FIG. 5C shows an embodiment of a user interface for creating a meal comprising multiple dishes. The user interface allows individual recipes for one or more dishes to be combined into a meal. A set of dishes retrieved in a search may be positioned horizontally across the user interface organized as a meal shown in FIG. 5C as entrée, side dish (1), side dish (2), and dessert. The results of the search may include multiple results for each category of dish.

Using arrows 540, a user may vertically scroll through search result choices within each dish category independent of each other category. For example, the leftmost arrows 540 allow a user to scroll through choices for the entrée dish. The right most arrows allow a user to scroll through choices for a dessert dish. Search filters may at least partially determine the number of choices presented in each of the entrée, side dish, and dessert categories. The system may define a default number of alternative dishes in each category that are available to the user when using the vertical scroll arrows 540. In an embodiment, additional dishes may be added to the meal in addition to the ones shown. Dishes may also be deleted from the meal.

Figure 6:
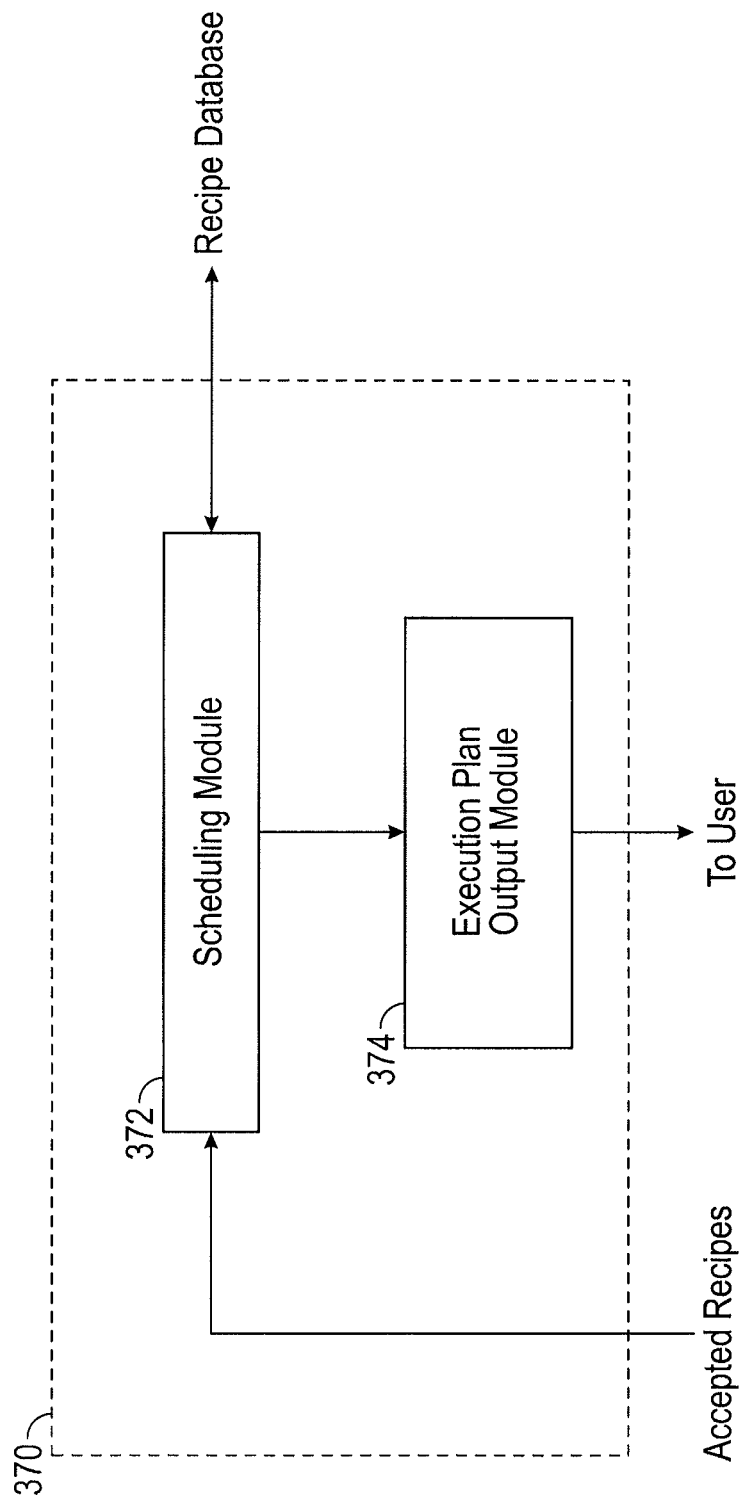
FIG. 6 is a block diagram of a recipe execution plan generator 370.

As choices for each dish in the meal are scrolled through, the illustrated embodiment may update the nutritional information 530, tools needed information 520, and ingredients needed information 510 based on a current set of displayed dishes in the meal. This is another advantageous aspect of the meal-centric user interface provided in some embodiments. One or more, and preferably all of the informational items presented on this user interface such as nutritional information, tools needed, and ingredients needed relate to the entire meal including all displayed dishes, not merely one recipe for one dish. This removes the need to separately peruse recipes that may include overlapping ingredients or to add calories or other numbers from different recipes. Once the user is satisfied with the displayed meal, they may select the start button 550 to begin the meal preparation process. At this point, the recipe execution plan generator 370 may create a recipe execution plan for the entire meal FIG. 6 is a block diagram of a recipe execution plan generator 370. The recipe execution plan generator 370 includes a scheduling module 372 and an execution plan output module 374. The scheduling module 372 receives recipe data from a recipe database, which may be recipe data store 315, illustrated in FIG. 3. Scheduling module 372 also receives an indication of accepted/selected recipes, for example, from a user 360 as illustrated in FIG. 3. The scheduling module 372 may then determine a schedule for a meal based on at least the accepted recipes. For example, the scheduling module 372 may determine a combined preparation schedule and instruction set for a first recipe and a second recipe included in a meal. The schedule for the first recipe may be affected by the schedule for the second recipe, and the schedule for the second recipe may be affected by the first recipe. Thus, the schedule for a set of steps to prepare a first recipe in a recipe execution plan may differ depending on which second (or third, etc.) recipe is combined with the first in a meal.

After the schedule for the meal has been determined by scheduling module 372, the meal schedule is provided to execution plan output module 374. The execution plan output module 374 then delivers data associated with the execution plan to a user. For example, data associated with the execution plan may be delivered to user 360 over WAN 350, as illustrated in FIG. 3.

Figure 7:
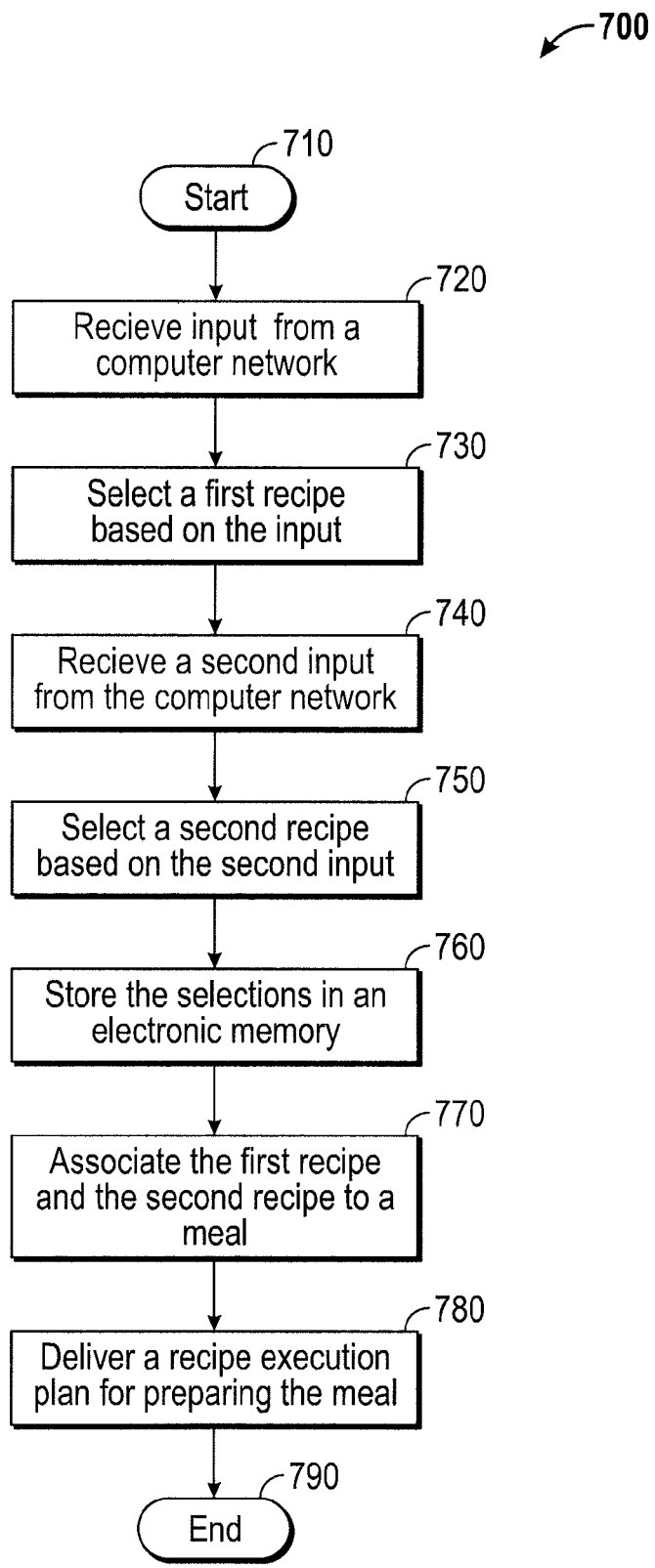
FIG. 7 shows a flowchart of a method for preparing a meal.

FIG. 7 shows a flowchart of a method for preparing a meal that may be implemented with the system of FIG. 3. Process 700 may be implemented by instructions included in a web application running in application server 210 illustrated in FIG. 2. Process 700 begins at start block 710 and then moves to block 720 where input is received from a computer network. Process 700 then moves to block 730 where a first recipe is selected based on the input from the computer network. Process 700 then moves to block 740 where a second input is received from the computer network. Process 700 then moves to block 750 where a second recipe is selected based on the second input. Process 700 then moves to block 760 where the selections are stored to an electronic memory. While process 700 is illustrated as receiving two separate inputs from the network and selecting a corresponding first recipe and second recipe based on those two network inputs, one with skill in the art would recognize variations in this method. For example, both the first recipe and the second recipe may be selected based on a single input from the network. Similarly, while block 760 indicates that the selection of the first recipe and the second recipe are both stored as one operation, storing of the selection of the first recipe to a computer memory may be performed independently of the storing of the selection of the second recipe to a computer memory. After the selections are stored to an electronic memory, process 700 moves to block 770 where the first recipe and the second recipe are associated as a meal. Process 700 then moves to block 780 where an execution plan for preparing the meal is delivered. In an embodiment, the execution plan for preparing the meal may be delivered across a network to a user. In an embodiment, the execution plan may be displayed in a user interface, for example, in a web browser, after it is delivered to the user. Process 700 then moves to end state 790.

As noted above, the scheduling module 372 can aggregate scheduling information across recipes to create a schedule for an entire meal. The system can also receive a meal serving time from a user. Once all of the individual recipes for a particular meal have been selected, each step of a meal preparation can be scheduled so that all of the individual meal items are ready to be served at the meal serving time. For example, if homemade bread is to be served at 6 pm, the system can instruct the food preparer to begin mixing the dough at 1 PM, to ensure adequate time for the bread to rise and complete its baking cycle.

Other powerful scheduling capabilities are possible. For example, conflicts between individual recipes may be identified. Default scheduling of two recipes may require the chef to mix the bread batter and tenderize the meat at the same time. Since the system recognizes the multiple recipes as parts of a single meal, it can recognize this conflict and adjust the default scheduling based on the resources available. Kitchen supplies can be considered resources. For example, a food preparer may record their inventory of kitchen supplies as part of their user profile and the execution plan generator may have access to this information. If two individual recipes both require use of the oven at a certain temperature, the system may modify the default schedule of one or both items to eliminate double tasking of the oven resource, while preserving the meal serving time and maintaining food quality.

Properly deconstructed recipes allow time variables to be associated with any action, ingredient, container or utensil. For instance, the amount of time needed to make a chicken stock as opposed to buying a can of pre-made stock. Or the difference in heating times of an aluminum skillet versus a copper skillet. Actions can have variable time components as well like the amount of time required to knead dough by hand as opposed to using an electric mixer. Geolocation information about the user can provide data on how long it takes water to boil or how long something should be cooked. All of this data may be used by the scheduling module 372 to make adjustments to the delivered recipe execution plan.

With individual recipes in a uniform format, the system can make decisions on how to order steps along a linear time line. Redundancy may be reduced by combining ingredients shared between recipes into one preparation step. The scheduling module 372 may calculate a uniform serving time by employing temporal logic on each of the deconstructed components within a recipe. Each step within a recipe can have an associated time value, based on the deconstructed attributes and actions within it. Therefore, the total time required for each recipe will be the sum of each of its steps. The recipe with the longest cook time may serve as the yardstick for when the steps within other recipes should be addressed.

Meals that require more than one person can be broken into individual task timelines. This is especially important for larger special occasion meals or event catering. In some implementations, the system may assess the abilities of each person involved and take inventory of the tools and kitchen appliances available. Using this data along with temporal logic, the scheduling module 372 can intelligently plan the process to ensure that all the recipes are synchronized and ready at the same time.

Figure 8:
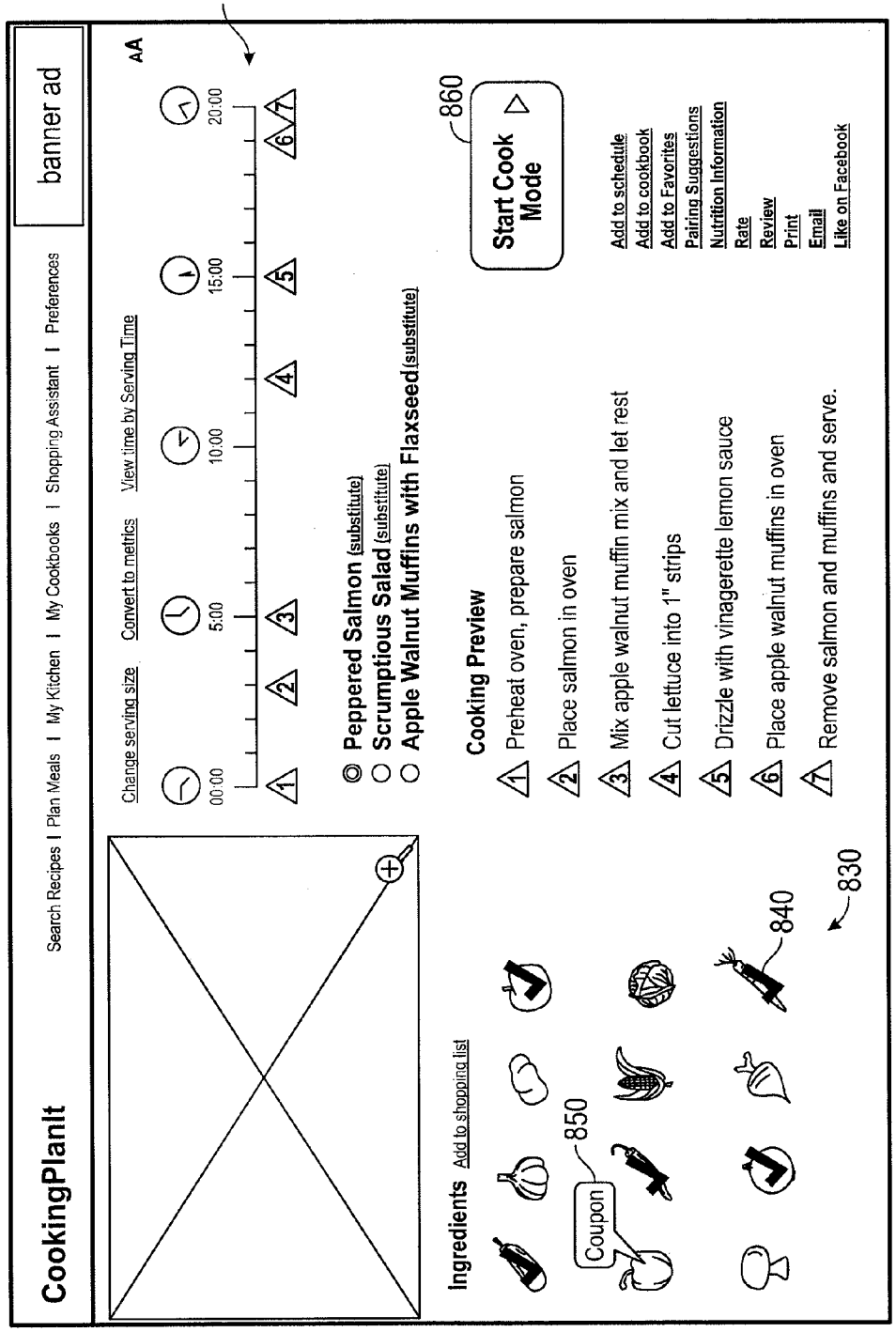
FIG. 8 is an embodiment of a user interface for a meal overview.

FIG. 8 is an embodiment of a user interface for a meal overview. This user interface may form a summary of the recipe execution plan created by the scheduling module 372, and may be delivered by the recipe execution plan generator 370 after the user clicks on the Start button 550 shown in FIG. 5C for example. This user interface displays an ingredient inventory 830, a meal schedule overview 820, and a start cook mode button 860. The ingredient inventory 830 includes icons that provide a status for each ingredient needed for the meal. For example, the meal shown in the user interface includes at least mushrooms, onions, carrots, and tomatoes. As shown, the meal ingredients with a check mark, such as carrots 840, are recorded as present in a current food inventory. Some meal ingredients may have coupons available, as indicated by notification bubble 850. Selecting the notification 850 may allow a user to print a coupon that may be used to receive a discount on the cost of the ingredient. In some embodiments, these coupons may be based on the geographic location of the user preparing the meal, or the user responsible for shopping for the meal.

The meal schedule summary 820 displays a summary of events associated with preparation of the meal. Major events in the meal preparation are illustrated as triangles below the timeline in the meal schedule summary. Explanations of the major events in the meal preparation as described below the meal schedule summary. When a user is ready to being the food preparation process, they may select the start cook mode button 860. When this button is pressed, a series of detailed instructions may be sequentially presented to the user by the recipe execution plan generator 370 to walk them through the combined meal preparation process including multiple dishes.

In this "Cook Mode," the steps may be clearly written and displayed on the device, whether it's a computer, tablet or smart phone. Hands free operation can allow the cook to give an audio command for the next step to be displayed. A cook may work on a series of steps for one recipe before being directed to work on another series of steps for another recipe. The cook may be offered a choice to prepare tasks ahead of time, such as marinades, dry rubs or refrigerated items. These completed steps can be removed from the process and the timeline can be recalculated by the scheduling module 372 in response to such selections by the user.

The Cook Mode may also utilize passive timers, active timers and buffer timers to make decisions on which steps should take priority. Passive timers do not require the cook's full attention like baking an item in the oven. Active timers require a cook's full attention like actively stirring or kneading. Buffer timers allow flexibility within the timeline by allowing the user to take a break on the current recipe and address another.

While a cook is engaged in Cook Mode, behind-the-scene clock can keep track of how long it takes the user to move from one step to the next. Since each step has a pre-defined average time value, these can be cross-referenced with the user's actual experience to make more accurate time calculations for future recipes. For instance, if a recipe has a total cook time of 30 minutes but the cook completes it in 45 minutes, the system can identify which steps took longer and provide options for products or services to improve efficiency. This information can be stored and accessed to customize delivered execution plans.

Additional enhancements to the personalization of the system for each user can be further provided. For example, although systems have been proposed that perform recipe database searches based on user profile information such as food likes, dislikes, allergies, etc., no system has been contemplated where individual recipes from a database are personalized according to information from a user profile. FIGS. 9 through 15 illustrate systems with this capability.

Figure 9:
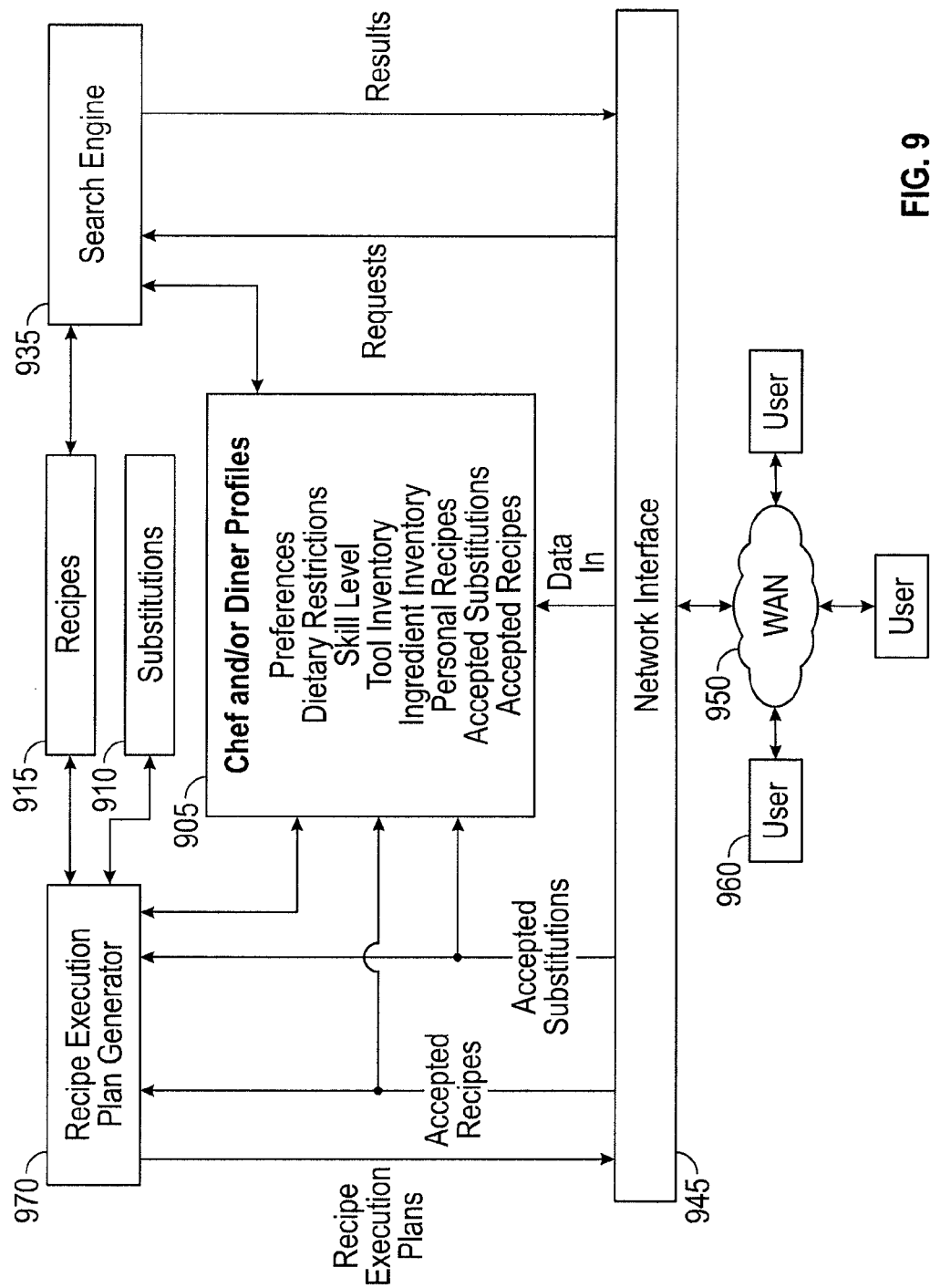
FIG. 9 is a block diagram of an apparatus for managing and scheduling meal preparation.

FIG. 9 is a block diagram of an apparatus for managing and scheduling meal preparation. The apparatus includes a network interface 945, search engine 935, recipe data store 915, recipe execution plan generator 970, a substitutions data store 910, and chef and/or diner profiles 905. Search engine 935 and recipe execution plan generator 970 may include instructions that configure a digital electronic processor to perform functions of the apparatus. The apparatus is in communication with users 960 over WAN 950. Similar to the apparatus as described with reference to FIG. 3, a user may search for recipes using search engine 935. Similar to search engine 335, search engine 935 may communicate one or more recipes to a user 960 based, at least in part, on search filters specified by the user and/or on some data included in chef and/or diner profiles 905. The user 960 may then accept one or more of these recipes. Accepted recipes are communicated to execution plan generator 970.

The search engine 935 may present (e.g. on the user interface of FIG. 5C) a set of recipes to user 960 that may be inconsistent with some aspects of information in the profiles, such as dietary preferences, available tools, preferences, and the like. In an embodiment, the recipe execution plan generator 970 may determine one or more inconsistencies between one or more recipes in the set of recipes and criteria defined by chef and/or diner profiles 905.

In an embodiment, data associated with the search results, for example, recipe data, and data associated with inconsistencies as discussed above, may be delivered to the user 960 over WAN 950 by the search engine 935. In an embodiment, the recipe execution plan generator 970 may further identify possible substitutions from substitutions data store 910 that may resolve at least some of the inconsistencies discussed above. In an embodiment, data associated with the identified substitutions may also be delivered to the user 960 over WAN 950. In an embodiment, the data associated with the substitutions and the data associated with the set of recipes may be delivered at substantially the same time.

For example, a user may have a dairy dietary restriction, but a recipe in the set of recipes may include a dairy ingredient. The system may identify this inconsistency, and also identify that the dairy ingredient in the recipe may be substituted with a non-dairy ingredient, such as a soy based ingredient. Data associated with the possible substitution may be communicated to user 960, along with data associated with the recipe that includes the dairy inconsistency.

In an embodiment, the substitutions delivered to the user 960 may be displayed in a user interface, for example, a web browser based user interface. The user may then accept one or more of the suggested substitutions via the user interface. After the substitutions are accepted by the user, they may be communicated to the recipe execution plan generator 970. Accepted substitutions may also be added to the chef and/or diner profiles 905. For example, in an embodiment, an indicator of a customized recipe including one or more accepted substitutions may be stored in a "My Recipes" folder included in the chef and/or diner profiles 905.

Figure 10:
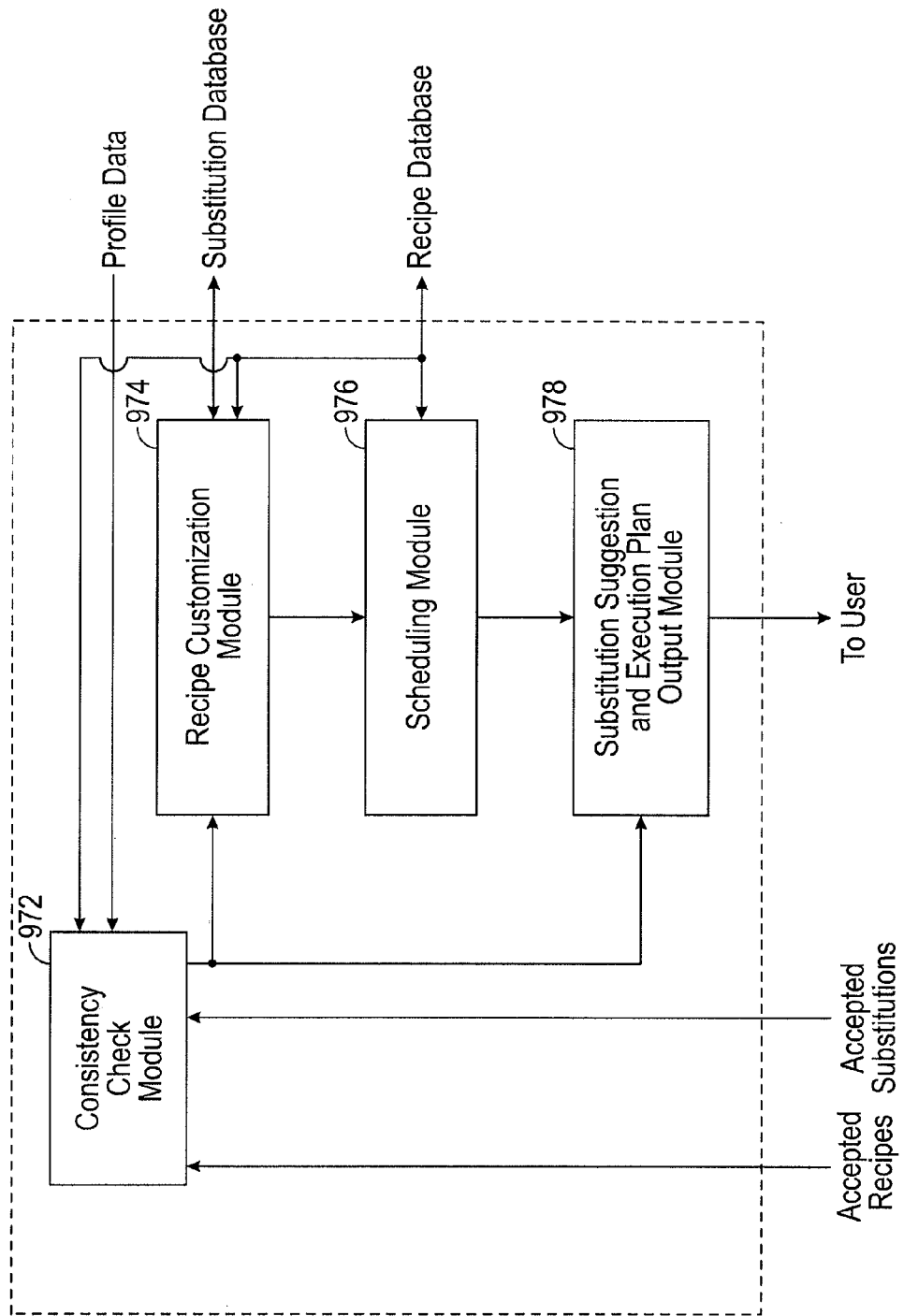
FIG. 10 is a block diagram of one embodiment of a recipe execution plan generator 970, as illustrated in FIG. 9.

FIG. 10 is a block diagram of one embodiment of a recipe execution plan generator 970, as illustrated in FIG. 9 that incorporates this functionality. Recipe execution plan generator 970 includes a recipe customization module 974, consistency check module 972, a scheduling module 976, and a substitution suggestion and execution plan output module 978.

The consistency check module 972 compares inputs associated with accepted recipes with profile data. The profile data may be chef and/or diner profile data, such as item 905 illustrated in FIG. 9. Based on the comparison, consistency check module 972 may identify inconsistencies between the accepted recipes and the profile data. The identified inconsistencies may be communicated to the substitution suggestion and execution plan output module 978.

The substitution suggestion and execution plan output module 978 may communicate possible substitutions to the user based on input from the consistency check module 972. For example, if the consistency check module 972 identifies that a recipe calls for use of a dairy ingredient, but the profile data indicates that dairy is restricted for the user, the substitution suggestion and execution plan module 978 may suggest use of a soy based ingredient to the user. If the user accepts this substitution, the acceptance will be communicated to recipe customization module 974.

The recipe customization module 974 receives input from a substitution database and a recipe database. The recipe customization module also receives as input accepted substitutions. Recipe customization module 974 may incorporate one or more accepted substitutions into one or more recipes in the recipe database. Once one or more substitutions have been applied to a recipe, the customized recipe is communicated to the scheduling module 976. The scheduling module 976 builds a schedule for preparing the customized recipe generated by recipe customization module 974. The schedule prepared by the scheduling module 976 may be considered an execution plan. The execution plan is then communicated to the substitution suggestion and execution plan output module 978.

The substitution suggestion and execution plan output module 978 then delivers the execution plan to the user. In an embodiment, the execution plan may be delivered to the user over a wide area network, such as the Internet.

Figure 11:
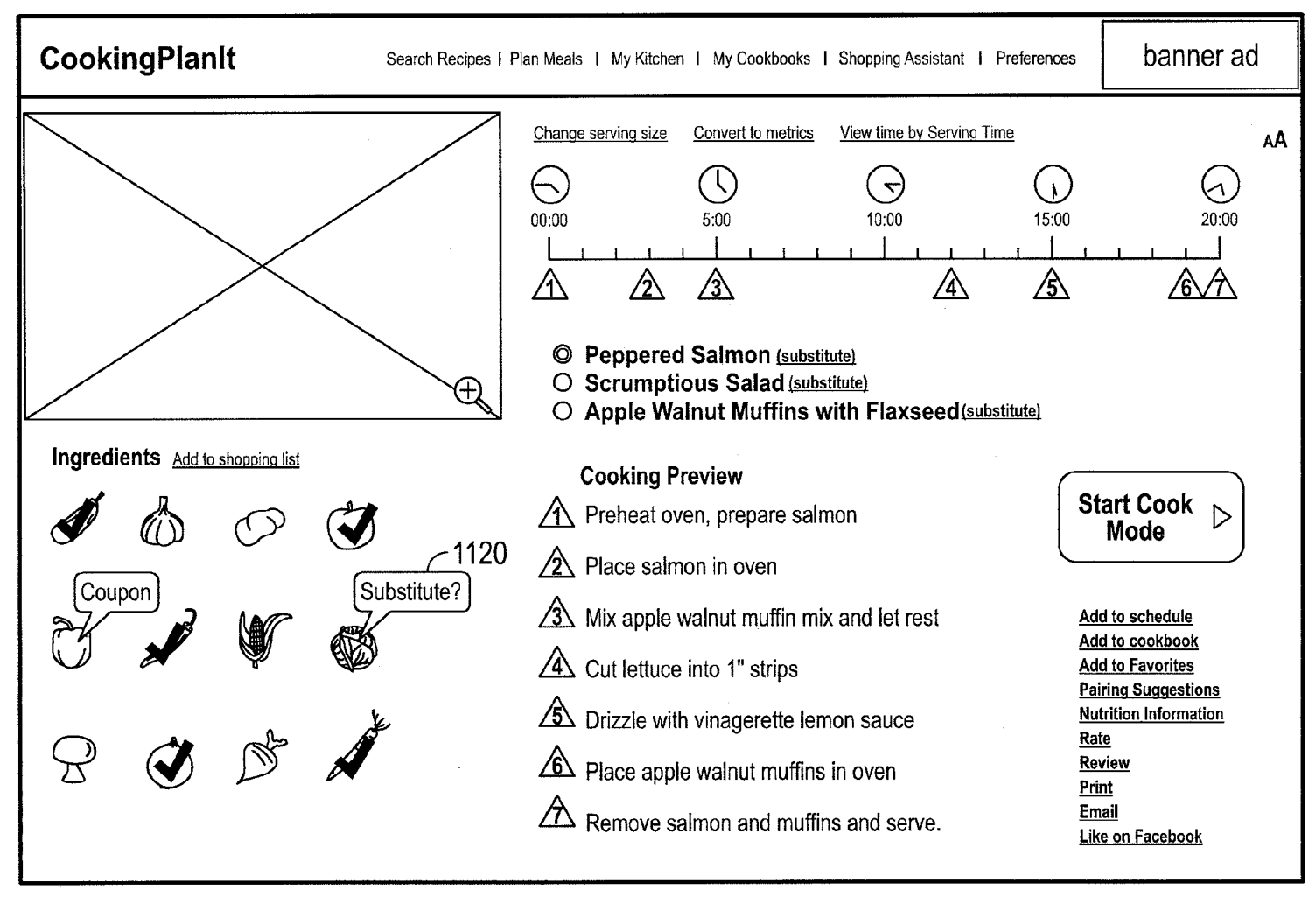

FIG. 11 shows one embodiment of a user interface for a meal overview page. The user interface shown in FIG. 11 is similar to the user interface discussed with respect to FIG. 8. The user interface of FIG. 11 differs from the user interface of FIG. 8 in that the ingredient list shows an ingredient that includes a substitution bubble 1120. The substitution bubble 1120 indicates that a substitution may be available for the ingredient. The user interface of FIG. 11 may be implemented in conjunction with the embodiment shown in FIG. 9. In this implementation, a user may select a meal using the interface of FIG. 5C. The recipe execution plan generator 970 may prepare the summary interface, as described above with reference to FIG. 8, but this time including information about suggested substitutions related to inconsistencies with user profile data. If substitutions are accepted, this is communicated to the recipe execution plan generator, which then adjusts the recipe execution plan, including any dependent timing changes, in accordance with the substitution, and returns the adjusted execution plan to the user.

Figure 12:
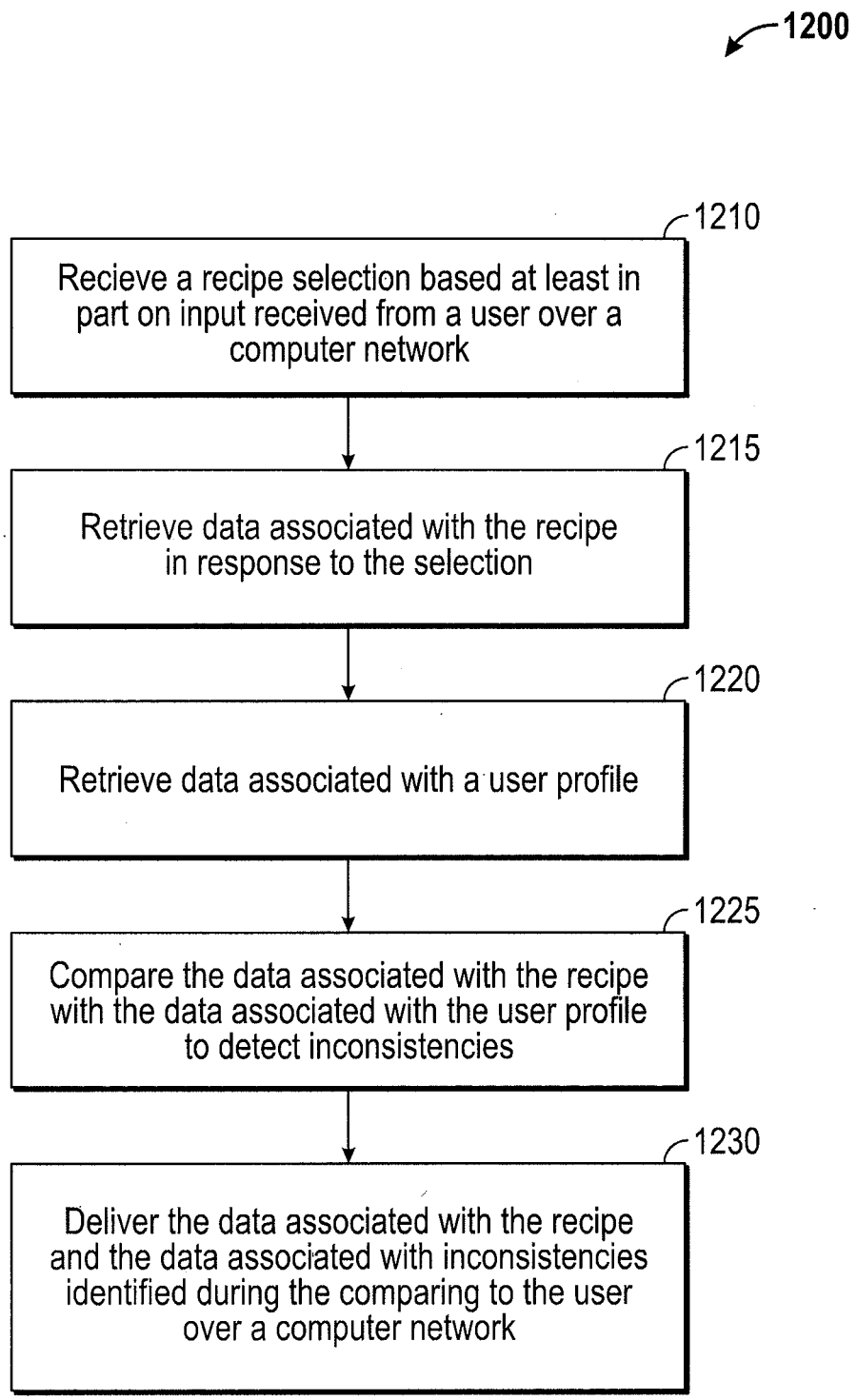
FIG. 12 is a flowchart of one implementation of a method for managing a recipe over a computer network.

FIG. 12 is a flowchart of one implementation of a method for managing a recipe over a computer network. In an embodiment, process 1200 may be performed by the apparatus shown in FIG. 9. The flowchart begins at block 1210, where a first recipe selection based at least in part on input received from a user over a computer network is received. In an embodiment, a user may interact with a computer user interface, such as a browser user interface, to select a recipe. In an embodiment, selection of the recipe by the user may be transmitted across the computer network to a network server. In an embodiment, the server may be performing process 1200, and may then receive the recipe selection.

In block 1215, data associated with the selected recipe is retrieved in response to the selection. The data may include food ingredients and actions associated with preparation and/or cooking of ingredients. The food ingredients may have associated with them one or more characteristics. For example, the characteristics associated with the food ingredients may include dairy, gluten, nut, wheat or other characteristics.

In an embodiment, the recipe actions may include a tuple associating an action with one or more of the recipe's ingredients. In an embodiment, a recipe action may specify an action be performed on one or more ingredients of a recipe. For example, a recipe action may specify that an onion be chopped. Alternatively, a recipe action may indicate that butter and milk be mixed.

In block 1220, data associated with a user profile is retrieved. In an embodiment, the data associated with the user profile may define one or more characteristics of the user. As described above, the user profile may define food restrictions or food preferences of the user. For example, some users may be allergic to or prefer not to consume foods that include for example, one or more of meat, fish, daily products such as milk or butter, wheat, gluten, nuts, or other types of food items. Some embodiments may store information indicating these preferences or allergies in the user profile.

In an embodiment, data associated with the user profile may also indicate cooking equipment available to the user. For example, the user profile may indicate whether the user has access to a food processor, oven, microwave, mixer, grinder, or the like. In an embodiment, the profile may indicate how many ovens the user has access to, and what each oven's capacities and capabilities are.

In block 1225, the data associated with the recipe is compared with the data associated with the user profile. Inconsistencies may be detected. For example, inconsistencies between one or more recipe inputs or recipe actions and the user profile may be detected. For example, the recipe may specify a first, second, and third ingredient having one or more characteristics. For example, in an embodiment, the first ingredient may be classified as a dairy ingredient, while the second ingredient is classified as a nut ingredient.

In an embodiment, the user profile or user characteristics indicated by the user profile may be inconsistent with these project inputs. For example, the user profile may specify that the user is allergic to or does not like to consume dairy food items. This inconsistency is detected in block 1225. The user profile may also indicate the user is allergic to nuts. This inconsistency with the second ingredient may also be identified in block 1225.

In block 1230, data associated the recipe and the data associated with inconsistencies identified during the comparing are delivered to the user over a computer network. In an embodiment, delivering the data to the user over a computer network may include displaying the data to the user on an electronic display.

In some embodiments, process 1200 may also generate one or more alternative recipe ingredients or recipe actions based on the identified inconsistencies. In an embodiment, the alternative recipe ingredients or actions, if incorporated into the recipe, may reduce or eliminate a number of inconsistencies identified between the user profile and the recipe. The alternative recipe ingredients or actions may indicate one or more existing recipe ingredients or actions be removed from the project if the alternative recipe ingredients or actions are incorporated into the recipe.

For example, in the embodiment discussed above, if a recipe includes a dairy ingredient and the user profile indicates the user is allergic to dairy items, an alternative recipe consisting of a soy-based ingredient may be generated.

One or more alternative recipe ingredients or actions may be generated by process 1200, for example, in block 1225. In an embodiment, a list of alternative recipe ingredients or actions may also be delivered to the user over a computer network, for example, in block 1230. In some embodiments, the data associated with alternative recipe ingredients or actions that are consistent with the user profile, the data associated with recipe ingredients and/or actions, and the data associated with inconsistencies identified in block 1225 may be delivered at substantially the same time to the user.

In some embodiments, after data is delivered to the user over a computer network, a selection of one or more alternative recipe ingredients or actions may be received over the computer network. In one example, the data delivered to the user over the computer network may be formatted on an electronic display, with appropriate user interfaces to allow the user to select if any of the alternatives presented to them are acceptable. In response, the user may select none, one, or more of the delivered alternatives via the user interface on the electronic display.

The selection by the user may be indicated in network communication between the user and a computer performing process 1200. In an embodiment, one or more alternative recipe ingredients or recipe actions may be incorporated into the recipe in response to the selection of one or more alternative recipe inputs and/or actions. Incorporation into the recipe may include deleting one or more ingredients or actions determined to be inconsistent with the user profile. Incorporation may also include substituting one or more of the alternative ingredients or actions for one or more ingredients or actions determined to be inconsistent with the user profile.

For example, a recipe may include milk as an ingredient. The user may also be presented with data indicating that soy milk may be substituted for the milk such that the recipe is consistent with preferences indicated by the user profile. In an embodiment, the user may also be presented with data indicating that rice milk may be substituted for milk in the recipe. The substitution of soy milk and the substitution of rice milk are alternative recipe ingredients in this example. The user may select the rice milk substitution. The selection by the user may result in reception of a selection of one of the alternative recipe ingredients and/or recipe actions (rice milk) from the user over the computer network.

In an embodiment, selection of an alternative recipe ingredient such as selecting rice milk in a recipe specifying cow's milk, may also cause adjustments to other project inputs or actions. For example, different mixing or baking times or baking temperatures may be appropriate when rice milk is used as an ingredient as compared to when cow's milk is used. Therefore, one or more recipe actions may be modified in response to receiving a selection of an alternative ingredient.

As another example, in the same food preparation embodiment, one action in the recipe may indicate that a flour ingredient should be sifted. The user's profile may indicate that the user does not have access to a sifter. An alternative food preparation step may be generated, which substitutes an action of sifting the flour. For example, an alternative action to whisk the flour may be generated. Another alternative action to mix the flour with a food processor may also be generated. These two alternative actions may be delivered to the user over a computer network. In response, the user may select an alternative action, for example, that they will mix the flour in a food processor. As a result of the user making a selection, a selection of one or more alternative recipe ingredients and/or recipe actions will be received over the computer network. In response to receiving the selection, the alternative action is incorporated into the project. For example, sifting the flour is removed from the recipe and mixing the flour with a food processor is inserted into the recipe.

In an embodiment, in response to the selection of one or more alternative recipe ingredients or recipe actions, data indicating a second recipe may be delivered to the user over a computer network. In an embodiment, the second recipe may be based on the first recipe. In an embodiment, the second recipe may include the selected alternative ingredients or actions, and not include ingredients or actions included in the first recipe that were replaced by the alternative recipe ingredients or actions. In an embodiment, the second recipe may not be based on the first recipe. For example, based on selections received from a user, process 1200 may determine that the second recipe may be preferred by the user over the first recipe or the first recipe with the selected alternative ingredients or actions applied.

In some embodiments, a modified version of a recipe may be stored in response to the selection of an alternative recipe ingredient or action. In other embodiments, meta-data indicating the first recipe and selected alternative ingredients or actions may be stored. The modified recipe may then be recreated dynamically based on the meta-data. In an embodiment, the modified recipe may be associated with the user. For example, in the food preparation embodiment, the modified recipe may be associated with the user's "my recipes" feature. The modified recipe may be stored, or meta-data indicating the original recipe, along with selected alternative ingredients or preparation steps may be stored.

In an embodiment, a shopping list may be generated based on the modified recipe. The modified shopping list may be generated in response to the selection of one or more alternative ingredients for the recipe.

In an embodiment, inconsistencies may be determined in block 1225 based on a skill level indicated by the user profile. For example, data associated with a recipe may indicate a skill or skill level necessary to successfully prepare the recipe or a portion of the recipe. The user profile may indicate a user's skill level. For example, the user profile may indicate a relative skill level such as novice, intermediate, advanced, or expert. Similarly, a recipe may specify a minimum skill level necessary to prepare the recipe. In an embodiment, if the user's skill level indicated by the user profile is below the skill level indicated in the recipe, the inconsistency may be identified.

In some embodiments, multiple specific cooking skills may be indicated in the user profile. For example, the user profile may indicate cooking skills including knife skills, flambéing, caramelizing, and sautéing. Similarly, a recipe may specify one or more specific cooking skills necessary to prepare the recipe. If a skill is indicated by the recipe but not indicated by the user profile, this may be detected as an inconsistency in block 1225.

In an embodiment, substitutions may be determined based on the skill inconsistencies. In an embodiment, these substitutions may be suggested to the user. If the user accepts one or more of the substitutions, they may be incorporated into the recipe. In another embodiment, portions of a recipe requiring skills inconsistent with a user profile may be automatically modified to change or eliminate the skill requirements. For example, if a recipe includes caramelizing sugar, but the user profile does not include a caramelizing skill, a substitution may be generated that specifies that turbinado sugar be used. If this substitution is accepted by the user, the inconsistency associated with the caramelizing skill may be eliminated.

How the skills or skill levels indicated in the user profile are determined may vary by embodiment. In one embodiment, the user may manually configure their skill level in the user profile. For example, a user interface may be presented to the user that allows them to indicate their skill level or skills in the user profile. In another embodiment, at least some of a user's skills or skill levels may be determined automatically. In one embodiment, inputs generated by a user may be recorded to facilitate automatic determination of a user's skills or skill level.

The inputs may then be analyzed to determine user skills or skill level. For example, the time a user takes to perform a task associated with food preparation may be compared to an average time for other users to perform the same or a similar task. The user's skill level may then be based on a comparison of the time needed by the user and the average time of other users. In some embodiments, the time a user takes to perform a task may be averaged over several tasks, with this average compared to the average of other users. If a user improves their skills over time, the time the user consumes to complete one or more tasks may be reduced. This may change the comparison of the user's time to the time required by other users, resulting in a corresponding change in the user's determined skill level. A schedule for meal preparation may also be adjusted based on a comparison of a user's time to perform one or more tasks and other user's average time to perform those tasks.

Figure 13:
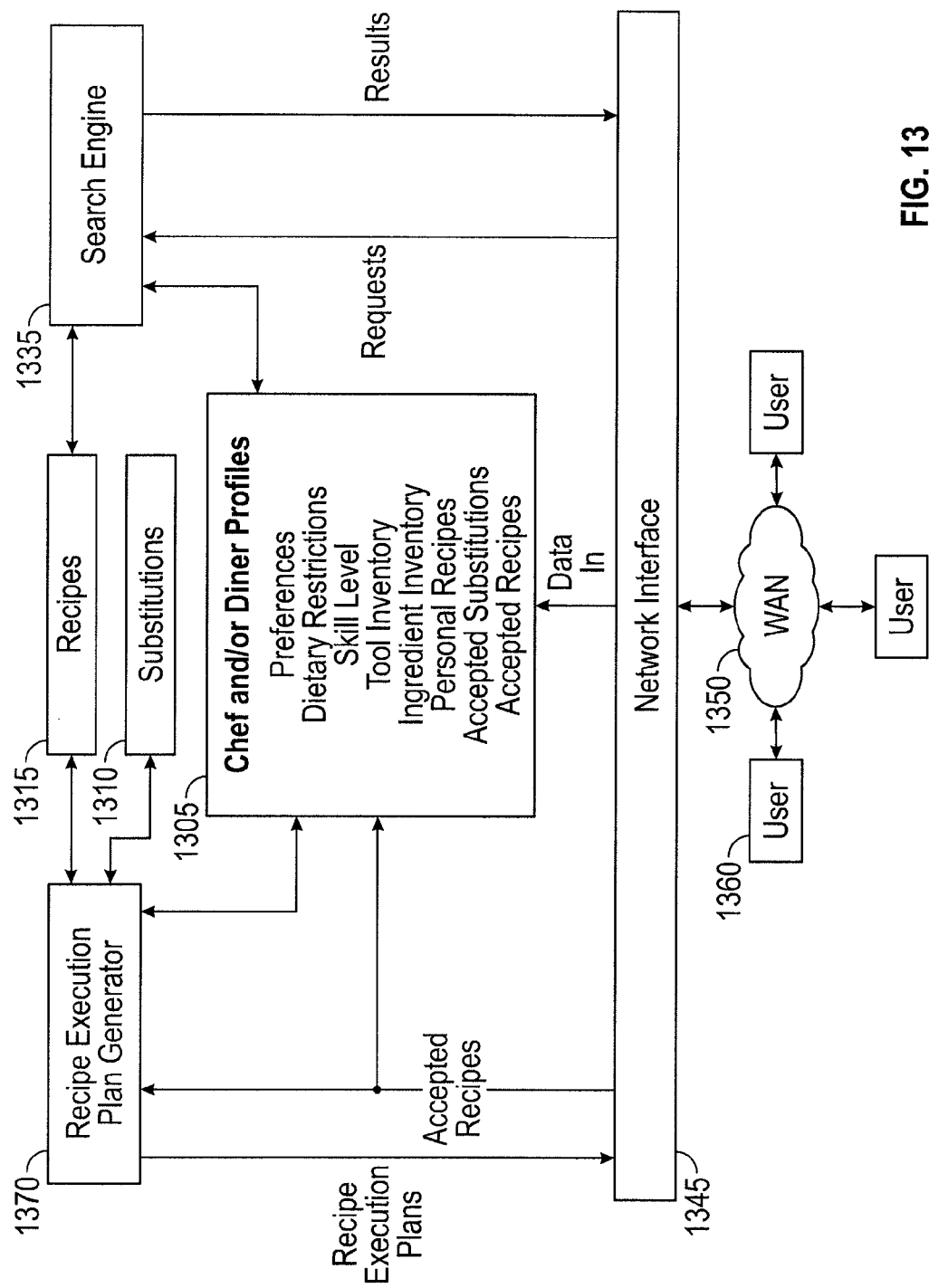
FIG. 13 is a block diagram of an apparatus for managing and scheduling meal preparation.

FIG. 13 is a block diagram of an apparatus for managing and scheduling meal preparation. The apparatus of FIG. 13 is similar to the apparatus illustrated in FIG. 9. However, in the apparatus of FIG. 13, data associated with substitutions generated based on information in the chef and/or diner profiles 1305 may not be delivered to the user 1360. Instead, search engine 1335 may automatically or without user input incorporate substitutions into a recipe. The substitutions may be determined based on inconsistencies detected between the chef and/or diner profile data 1305 and recipes identified from recipe data store 1315. The substitutions may also be determined based on inconsistencies detected between recipes in recipe data store 1315 and search criteria specified by user 1360 in a search request to search engine 1335. Because the substitutions are not presented to the user in the embodiment illustrated in FIG. 13, accepted substitutions are not provided by the user 1360 to the recipe execution plan generator 1370, as are provided to the embodiment of recipe execution plan generator 970, illustrated in FIG. 9.

Figure 14:
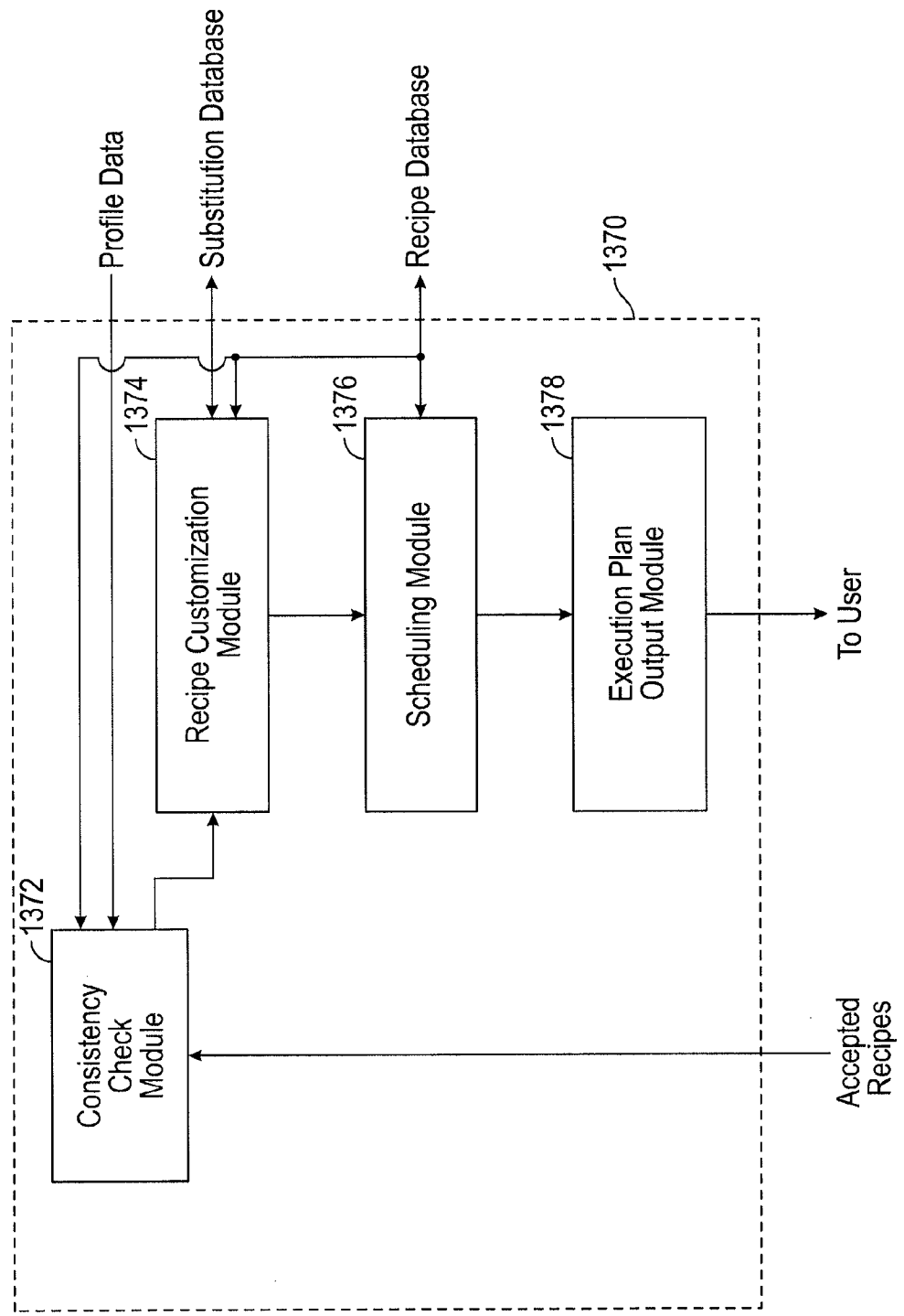
FIG. 14 is a block diagram of one embodiment of a recipe execution plan generator.

FIG. 14 is a block diagram of one embodiment of a recipe execution plan generator. The embodiment illustrated in FIG. 14 corresponds to recipe execution plan generator 1370, illustrated in FIG. 13. The recipe execution plan generator 1370 is similar to recipe execution plan generator 970, illustrated in FIG. 10. The recipe execution plan generator 1370 differs in that inconsistencies identified by the consistency check module 1372 are not delivered to a user. Instead, the inconsistencies are provided to the recipe customization module 1374. The recipe customization module 1374 generates data indicating a recipe from a recipe database that include determined substitutions from the substation database. This data is communicated to the scheduling module, which generates a schedule for the recipe including the substitutions. An execution plan based on the recipe including the substitutions is then communicated to the execution plan output module 1378, which delivers the execution plan to the user.

Figure 15:
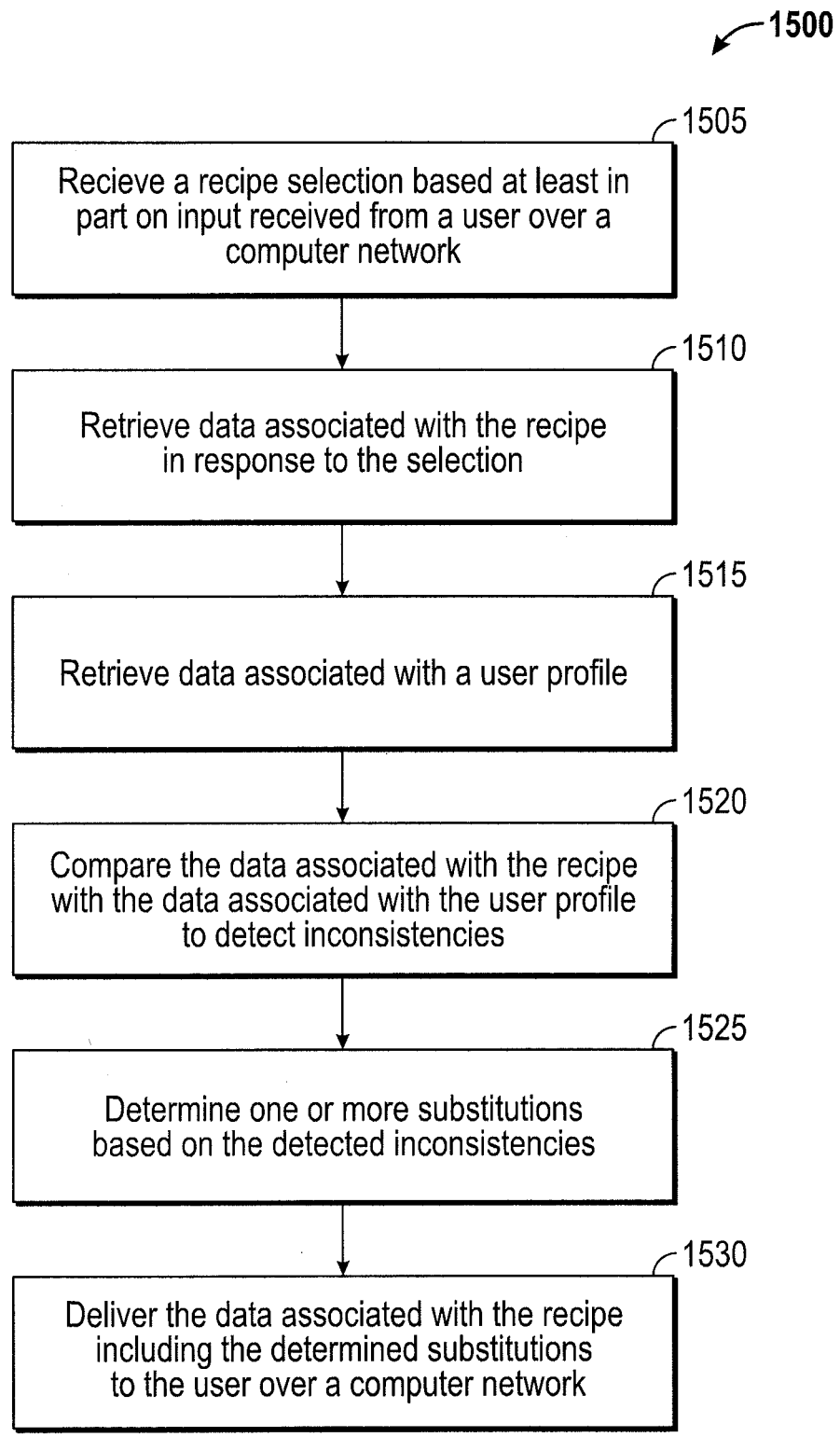
FIG. 15 is a flowchart of one implementation of a method for managing a recipe over a computer network.

FIG. 15 is a flowchart of a method of managing a recipe. In an embodiment, process 1500 may be implemented in the apparatus illustrated in FIG. 9. In block 1505, a recipe selection based at least in part on input received from a user over a computer network is received. In block 1510, data associated with the selected recipe is retrieved in response to the selection. In an embodiment, the data may be retrieved from a recipe data store, such as recipe data store 1315 illustrated in FIG. 13. In block 1515, data associated with a user profile is retrieved. The data associated with a user profile may be retrieved from a chef and/or diner profile 1305, as illustrated in FIG. 13.

In block 1520, the data associated with the recipe is compared to the data associated with the user profile to detect one or more inconsistencies. As discussed with respect to FIG. 12, in an embodiment, the inconsistencies may relate to the user's food preferences, dietary restrictions, kitchen tools and supplies inventory, or cooking skills. As described with respect to FIG. 12, skill levels of a user may be manually configured or automatically determined. These skill levels may be compared to skills indicated in the recipe to determine one or more inconsistencies.

In block 1525, one or more substitutions are determined based on the detected inconsistencies. As discussed with respect to FIG. 12, the substitutions may substitute one ingredient for another ingredient in the recipe. For example, soy milk may be substituted for cow's milk based on a dietary restriction indicated by the user profile that the user should not consume dairy products. Substitutions for actions defined as part of the recipe may also be determined in block 1525. For example, as discussed above, a recipe may indicate that flour should be sifted, while the user profile data may indicate that the user does not own a sifter. This inconsistency may be detected in block 1520. A substitution determined in block 1525 may be to use a food processor on the flour instead of a sifter.

In block 1530, data associated with the recipe including the determined substitutions is delivered to the user over a computer network. In an embodiment, a modified recipe may be generated that includes the substitutions determined in block 1525. Data associated with the modified recipe may be delivered to the user. In an embodiment, delivering to the user may comprise sending the data over a network to a destination address associated with the user. In another embodiment, a modified recipe may not be generated. Instead, meta-data associating the recipe selected in block 1505 and the substitutions determined in block 1525 may be generated. Data associated with this meta-data may be delivered to the user in block 1530. In another embodiment, data indicating the recipe selected in block 1505 and the substitutions may be delivered to the user in block 1530. In this embodiment, a program running on a client computer may then display a modified recipe to the user based on the delivered substitutions and selected recipe.

In some embodiments, the system may operate in accordance with FIGS. 9 through 12, and if a user accepts a particular substitution, the system could thereafter make that substitution in all future interactions as described with respect to FIGS. 13 through 15.

It will be appreciated that the systems and methods described herein may be applied to environments other than cooking. Any project having inputs and actions analogous to a recipe having ingredients and cooking activities can be managed in accordance with the above. Such environments may include construction or home improvement projects for example. Such a project may have a standard plan that includes tools the user does not have access to. Substitutions can be identified and used to create modified project plan incorporating the substitutions as described above.

Headings are included herein for reference and to aid in locating various sections. These headings are not intended to limit the scope of the concepts described with respect thereto. Such concepts may have applicability throughout the entire specification.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

Having thus described a preferred embodiment of a method and system for organizing and scheduling meals over a network, it should be apparent to those skilled in the art that certain advantages of the disclosed method and system have been achieved. It should also be appreciated that various modifications, adaptations, and alternative embodiments thereof may be made within the scope and spirit of the present invention. The invention is further defined by the following claims.

What is claimed is:

1. A method of preparing a meal comprising:
sending information over a computer network to a data store defining one or more of food preferences; dietary restrictions, cooking tools available, food ingredients available, and cooking skill level;
sending a recipe selection over a computer network, wherein the selected recipe contains one or more ingredients or actions that are inconsistent with at least one of the food preferences, dietary restrictions, cooking tools available, food ingredients available, and cooking skill level information previously sent; and
receiving, over the computer network, a recipe execution plan for the selected recipe containing substitutions for one or more ingredients or actions that reduce or eliminate the inconsistencies, wherein the selected recipe contains one or more actions that are inconsistent with at least one of defined cooking tools available, and cooking skill level information, and wherein the received recipe execution plan for the selected recipe contains one or more substitute actions that reduce or eliminate the inconsistencies.

2. The method of claim 1, additionally comprising:
receiving information over a computer network indicating inconsistencies between the selected recipe and at least one of the food preferences, dietary restrictions, cooking tools available, food ingredients available, and cooking skill level information previously sent; and
selecting a substitution in response to the receiving.

3. The method of claim 1, wherein the selected recipe has a recipe name and the selected recipe containing substitutions has the same recipe name.

4. The method of claim 1, wherein the selected recipe includes a plurality of not inconsistent ingredients and actions and the selected recipe containing substitutions still includes the plurality of not inconsistent ingredients and actions.

5. An apparatus for preparing a meal, comprising:
an electronic processor;
a memory, storing instructions that configure the processor to perform a method of preparing a meal, the method comprising:
sending information over a computer network to a data store defining one or more of food preferences;

dietary restrictions; cooking tools available, food ingredients available, and cooking skill level;

sending a recipe selection over a computer network, wherein the selected recipe contains one or more ingredients or actions that are inconsistent with at least one of the food preferences, dietary restrictions, cooking tools available; food ingredients available, and cooking skill level information previously sent, and receiving, over a computer network, a recipe execution plan for the selected recipe containing substitutions for one or more ingredients or actions that reduce or eliminate the inconsistencies, wherein the selected recipe contains one or more actions that are inconsistent with at least one of defined cooking tools available, and cooking skill level information, and wherein the received recipe execution plan for the selected recipe contains one or more substitute actions that reduce or eliminate the inconsistencies.

6. The apparatus of claim 5, wherein the selected recipe has a recipe name and the selected recipe containing substitutions has the same recipe name.

7. The apparatus of claim 5, wherein the selected recipe includes a plurality of not inconsistent ingredients and actions and the selected recipe containing substitutions still includes the plurality of not inconsistent ingredients and actions.

8. The apparatus of claim 5, wherein the method further comprises:

receiving information over a computer network indicating inconsistencies between the selected recipe and at least one of the food preferences; dietary restrictions, cooking tools available; food ingredients available, and cooking skill level information previously sent; and selecting a substitution in response to the receiving.

* * * * *